United States Patent
Yamada et al.

(10) Patent No.: US 10,236,679 B2
(45) Date of Patent: Mar. 19, 2019

(54) CIRCUIT APPARATUS AND ELECTRONIC APPLIANCE

(71) Applicant: SEIKO EPSON CORPORATION, Tokyo (JP)

(72) Inventors: Atsushi Yamada, Nagoya (JP); Katsumi Inoue, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 376 days.

(21) Appl. No.: 14/864,114

(22) Filed: Sep. 24, 2015

(65) Prior Publication Data

US 2016/0099560 A1 Apr. 7, 2016

(30) Foreign Application Priority Data

Oct. 3, 2014 (JP) ................................. 2014-204506

(51) Int. Cl.
*H02H 5/04* (2006.01)
*H02H 3/05* (2006.01)

(52) U.S. Cl.
CPC ............. *H02H 5/044* (2013.01); *H02H 3/05* (2013.01)

(58) Field of Classification Search
USPC ................................................ 361/24, 103
See application file for complete search history.

(56) References Cited

U.S. PATENT DOCUMENTS

| 5,563,760 A * | 10/1996 | Lowis ..................... G01K 3/14 361/103 |
| 5,939,863 A | 8/1999 | Miller |
| 6,545,886 B1 * | 4/2003 | Ireland ................... A63H 19/24 363/132 |
| 6,584,128 B2 * | 6/2003 | Kroeger ................ G05D 27/02 372/34 |
| 6,837,217 B1 * | 1/2005 | Hoshino ............... F02D 11/105 123/399 |
| 6,876,043 B1 * | 4/2005 | Sander ............... H01L 27/0248 257/378 |
| 7,042,180 B2 * | 5/2006 | Terry ..................... F04B 35/04 318/400.21 |
| 7,961,446 B2 | 6/2011 | Ide et al. |
| 8,354,813 B2 * | 1/2013 | Hasegawa .............. H02P 29/68 318/432 |

(Continued)

FOREIGN PATENT DOCUMENTS

| JP | S64-064565 A | 3/1989 |
| JP | H05-316746 A | 11/1993 |

(Continued)

*Primary Examiner* — Ronald W Leja
(74) *Attorney, Agent, or Firm* — Oliff PLC

(57) ABSTRACT

With an IC including a driver that drives a large current, its characteristics may be deteriorated or the IC may be broken by heat generated by the large current. By providing a plurality of sensors and disposing some of the sensors so as to be close to an output driver that flows a large current, which is a source of heat generation, an increase in the temperature of the IC can be rapidly detected, and the deterioration of the characteristics of the IC can be prevented by accurately actuating an overheating protection function based on a result of detection. Alternatively, breakage of the IC can be prevented by suppressing overheating.

18 Claims, 20 Drawing Sheets

(56) References Cited

U.S. PATENT DOCUMENTS

| | | | |
|---|---|---|---|
| 2003/0164545 A1* | 9/2003 | Nadd | H02H 7/0838 257/724 |
| 2003/0214770 A1* | 11/2003 | Schimanek | H03K 17/0822 361/100 |
| 2004/0227522 A1* | 11/2004 | Male | G01R 31/025 324/524 |
| 2005/0264971 A1 | 12/2005 | Morino | |
| 2007/0075656 A1* | 4/2007 | Moller | H02P 5/68 318/77 |
| 2013/0026968 A1 | 1/2013 | Tagome et al. | |
| 2013/0322487 A1 | 12/2013 | Watanabe et al. | |
| 2014/0368258 A1* | 12/2014 | Willkofer | H01L 23/34 327/513 |
| 2015/0030051 A1* | 1/2015 | Cortigiani | H02H 3/07 374/137 |
| 2016/0099560 A1* | 4/2016 | Yamada | H02H 5/044 361/103 |

FOREIGN PATENT DOCUMENTS

| | | |
|---|---|---|
| JP | H11-027854 A | 1/1999 |
| JP | 2005-347377 A | 12/2005 |
| JP | 2007-082365 A | 3/2007 |
| JP | 2011-101466 A | 5/2011 |
| JP | 2013-250175 A | 12/2013 |
| JP | 2014-163679 A | 9/2014 |
| WO | 2012/105266 A1 | 8/2012 |

\* cited by examiner

CIRCUIT APPARATUS AND ELECTRONIC APPLIANCE

BACKGROUND

1. Technical Field

The present invention relates to a circuit apparatus, an electronic appliance, and the like.

2. Related Art

A circuit apparatus for driving an object to be driven such as a DC motor is provided with an overheating protection circuit for preventing the circuit apparatus and the like from being broken by overheating caused by an overcurrent in the transistors constituting an H-bridge circuit. As techniques of the related art for such a circuit apparatus provided with an overheating protection circuit, techniques disclosed in, for example, JP-A-2005-347377 and JP-A-2007-82365 are known. These techniques of the related art implement an overheating protection function by disposing a temperature sensor unit in the circuit apparatus, detecting overheating due to an overcurrent based on a result of temperature detection performed by the temperature sensor unit, and turning off the transistors of the H-bridge circuit.

The techniques of the related art, however, do not give any consideration to the layout arrangement of the temperature sensor unit on the chip of the circuit apparatus. For this reason, there is a possibility that in the event of an overcurrent flowing between the source and the drain of a switching transistor in the H-bridge circuit to increase the temperature around the transistor, it takes time for the temperature increase to reach the temperature sensor unit, and as a result, the overheating protection operation is delayed. The delay of the overheating protection operation leads to problems such as the circuit apparatus being broken or the reliability being reduced.

SUMMARY

An advantage of some aspects of the invention is to provide a circuit apparatus, an electronic appliance and the like that can enhance the overheating protection/detection performance.

An aspect of the invention relates to a circuit apparatus including: a bridge circuit including a high-side transistor and a low-side transistor; at least one temperature sensor unit; and an overheating detection unit that performs overheating detection based on a temperature detection signal from the temperature sensor unit, wherein the temperature sensor unit is disposed in a position closer to the bridge circuit than the overheating detection unit is.

According to one aspect of the invention, in the circuit apparatus including a bridge circuit, the overheating detection unit performs overheating detection based on the temperature detection signal from the temperature sensor unit. The temperature sensor unit that performs temperature detection is disposed in a position closer to the bridge circuit than the overheating detection unit is. With this configuration, if, for example, an overheating state occurs due to an overcurrent in the bridge circuit, the temperature sensor unit disposed in a position close to the bridge circuit can detect the temperature in the overheating state in a shorter time. Accordingly, the overheating protection/detection performance can be enhanced as compared to a configuration in which the temperature sensor unit is disposed in a position far from the bridge circuit.

In one aspect of the invention, the temperature sensor unit may be disposed in an arrangement area of the bridge circuit.

As a result of disposing the temperature sensor unit in the arrangement area of the bridge circuit as described above, the temperature in the overheating state can be detected in a shorter time, and thus the detection performance such as the overheating protection/detection accuracy and the detection time can be further enhanced.

Another aspect of the invention relates to a circuit apparatus including: a bridge circuit including a high-side transistor and a low-side transistor; at least one temperature sensor unit; and an overheating detection unit that performs overheating detection based on a temperature detection signal from the temperature sensor unit, wherein the temperature sensor unit is disposed in an arrangement area of the bridge circuit.

According to one aspect of the invention, in the circuit apparatus including a bridge circuit, the temperature sensor unit that performs temperature detection is disposed in the arrangement area of the bridge circuit. With this configuration, the distance between the temperature sensor unit and the bridge circuit can be reduced to the shortest distance, and thus the temperature in the overheating state can be detected in a short time, and the overheating protection/detection accuracy can be enhanced.

In one aspect of the invention, if it is assumed that, in the arrangement area of the bridge circuit, an area extending along a first side located far from the overheating detection unit is defined as a first side area, and an area extending along a second side located close to the overheating detection unit is defined as a second side area, the temperature sensor unit may be disposed in the second side area.

With this configuration, the temperature sensor unit is disposed in the second side area located close to the overheating detection unit, and thus the overheating protection/detection accuracy can be further enhanced.

In one aspect of the invention, the circuit apparatus may include a low potential-side power supply pad that receives a low potential-side power supply, and the temperature sensor unit may be disposed in a position closer to the low potential-side power supply pad than the low-side transistor of the bridge circuit is.

With this configuration, the low potential-side power supply from the low potential-side power supply pad can be supplied to the temperature sensor unit at a low impedance, and thus the deterioration in the detection performance of detecting overheating due to noise or the like can be suppressed.

In one aspect of the invention, the circuit apparatus may include a driver circuit that outputs drive signals to the high-side transistor and the low-side transistor of the bridge circuit, and the temperature sensor unit may be disposed in a position closer to the bridge circuit than the driver circuit is.

With this configuration, the temperature sensor unit is disposed in a position closer to the bridge circuit than the driver circuit of the bridge circuit is, and thus the distance between the temperature sensor unit and the bridge circuit can be shortened, and the detection performance of detecting overheating can be enhanced.

In one aspect of the invention, the circuit apparatus may include a control circuit that performs control so as to turn on and off the high-side transistor and the low-side transistor of the bridge circuit, and the temperature sensor unit may be disposed in a position closer to the bridge circuit than the control circuit is.

With this configuration, the temperature sensor unit is disposed in a position closer to the bridge circuit than the control circuit that controls the bridge circuit is, and thus the distance between the temperature sensor unit and the bridge circuit can be shortened, and the detection performance of detecting overheating can be enhanced.

In one aspect of the invention, a plurality of temperature sensor units may be disposed as the at least one temperature sensor unit.

With this configuration, overheating detection can be performed based on the temperature detection signals from the plurality of temperature sensor units, and thus the detection performance of detecting overheating can be further enhanced.

In one aspect of the invention, a first temperature sensor unit among the plurality of temperature sensor units may be disposed in an arrangement area of the high-side transistor of the bridge circuit, and a second temperature sensor unit among the plurality of temperature sensor units may be disposed in an arrangement area of the low-side transistor of the bridge circuit.

With this configuration, for example, the first temperature sensor unit can detect an overheating state due to an overcurrent in the high-side transistor of the bridge circuit, and the second temperature sensor unit can detect an overheating state due to an overcurrent in the low-side transistor of the bridge circuit.

In one aspect of the invention, a first temperature sensor unit among the plurality of temperature sensor units may be disposed in an arrangement area of the bridge circuit, and a second temperature sensor unit among the plurality of temperature sensor units may be disposed in an outside area of the arrangement area of the bridge circuit.

With this configuration, overheating detection can be performed by using a result of temperature detection performed by the first temperature sensor unit disposed in the arrangement area of the bridge circuit and a result of temperature detection performed by the second temperature sensor unit disposed in the outside area of the arrangement area of the bridge circuit.

In one aspect of the invention, the circuit apparatus may include a second bridge circuit including a high-side transistor and a low-side transistor, and a first temperature sensor unit among the plurality of temperature sensor units may be disposed in an arrangement area of a first bridge circuit, which is the bridge circuit, and a second temperature sensor unit among the plurality of temperature sensor units may be disposed in an arrangement area of the second bridge circuit.

With this configuration, for example, the first temperature sensor unit can detect an overheating state due to an overcurrent in the first bridge circuit, and the second temperature sensor unit can detect an overheating state due to an overcurrent in the second bridge circuit.

In one aspect of the invention, a third temperature sensor unit among the plurality of temperature sensor units may be disposed between the first bridge circuit and the second bridge circuit.

With this configuration, overheating detection can be performed based on the results of temperature detection performed by the first, second and third temperature sensor units disposed in a dispersed manner in the arrangement areas of the first and second bridge circuits.

In one aspect of the invention, the overheating detection unit may perform overheating detection based on a first temperature detection signal from a first temperature sensor unit among the plurality of temperature sensor units and a second temperature detection signal from a second temperature sensor unit among the plurality of temperature sensor units.

With this configuration, overheating detection can be performed by using both the first temperature detection signal from the first temperature sensor unit and the second temperature detection signal from the second temperature sensor unit. Accordingly, the detection performance of detecting overheating can be enhanced as compared to a configuration in which overheating detection is performed based on the temperature detection signal from a single temperature sensor unit.

In one aspect of the invention, the overheating detection unit may perform overheating detection based on a result of comparison between the first temperature detection signal and the second temperature detection signal.

With this configuration, overheating detection can be performed by processing of comparison between the first temperature detection signal from the first temperature sensor unit and the second temperature detection signal from the second temperature sensor unit, and it is therefore possible to implement overheating detection that uses a temperature difference between a plurality of positions in the circuit apparatus.

In one aspect of the invention, the overheating detection unit may perform overheating detection based on temperature detection signals input in a time division manner from the plurality of temperature sensor units.

With this configuration, various types of determining processing operations for detecting overheating can be performed based on the temperature detection signals input in a time division manner from the plurality of temperature sensor units, and thus overheating detection with higher detection performance can be implemented.

In one aspect of the invention, the high-side transistor and the low-side transistor may be DMOS transistors, and the temperature sensor unit may be formed by a body diode of a DMOS transistor.

With this configuration, a body diode, which is a temperature detection element of the temperature sensor unit, can be implemented by effective utilization of the DMOS structure of the transistors constituting the bridge circuit.

Another aspect of the invention relates to an electronic appliance including any one of the circuit apparatuses described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail. It is to be noted that the embodiment described below is not intended to unduly limit the scope of the invention recited in the appended claims, and not all configurations described in the embodiment are necessarily essential to the solving means of the invention.

1. Configuration of Circuit Apparatus

Figure 1:
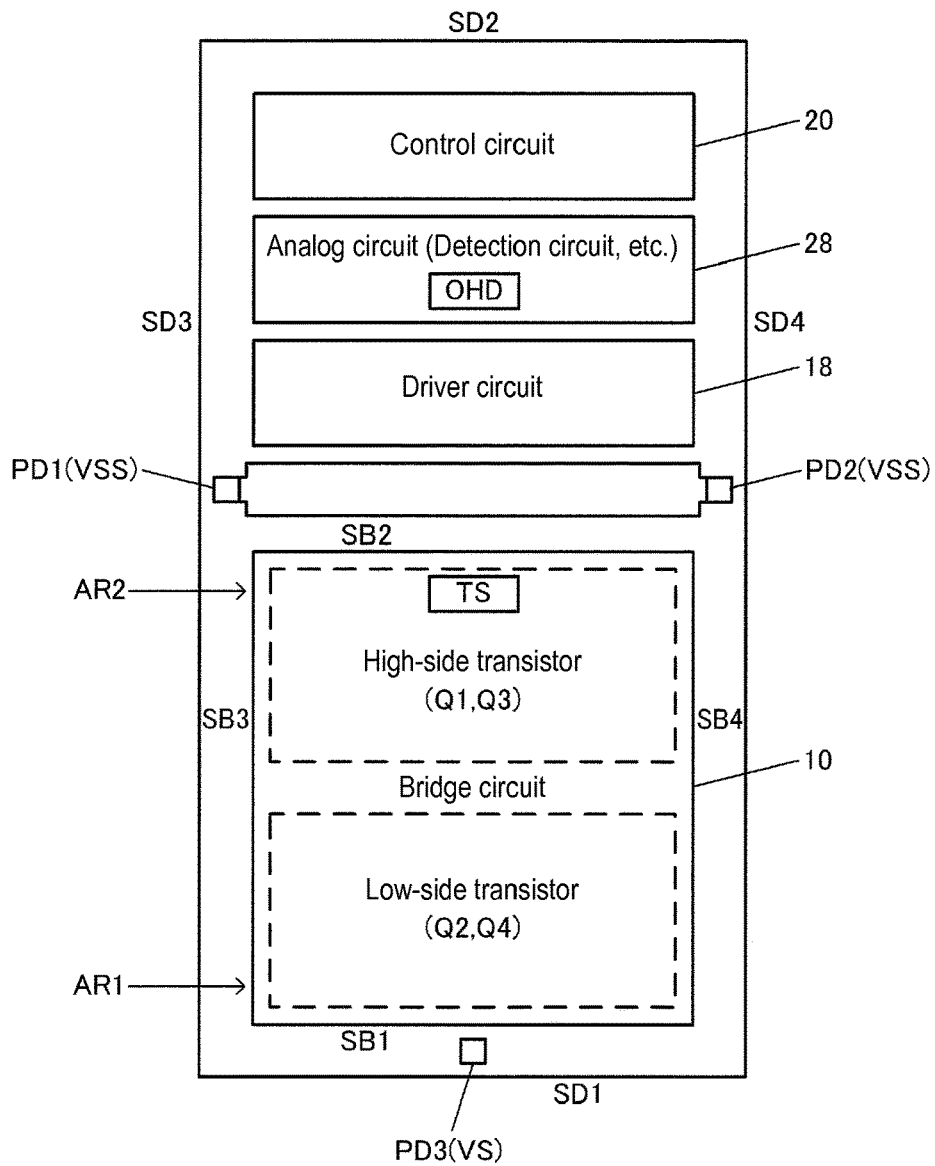
FIG. 1 shows an example configuration of a circuit apparatus according to an embodiment.
Figure 1:
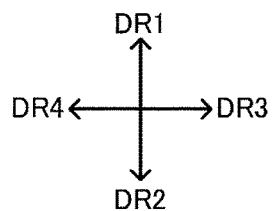

FIG. 1 shows an example configuration of a circuit apparatus according to an embodiment of the invention. FIG. 1 is a diagram showing an example of a circuit arrangement of the circuit apparatus according to the present embodiment in plan view. To be specific, FIG. 1 is a diagram showing a circuit layout arrangement as viewed from above in a direction perpendicular to a substrate of the circuit apparatus (semiconductor chip).

The circuit apparatus according to the present embodiment includes a bridge circuit 10 and an analog circuit 28. The circuit apparatus may also include a driver circuit 18 and a control circuit 20. The circuit apparatus of the present embodiment is not limited to the configuration shown in FIG. 1, and various variations can be made such as omitting some of the constituent elements or adding other constituent elements.

The bridge circuit 10 includes high-side (high-potential side) transistors (for example, Q1 and Q3 shown in FIG. 4 described later) and low-side (low-potential side) transistors (Q2 and Q4). The bridge circuit 10 is a circuit that outputs a drive current to a motor (for example, a DC motor), which is the object to be driven. A detailed configuration and operations of the bridge circuit 10 will be described later with reference to FIG. 4 and the like. Also, in the following description, an example will be described in which the circuit apparatus is a motor driver for driving a motor, but the object to be driven by the circuit apparatus according to the present embodiment is not limited to a motor, and various elements and devices having inductors (coils) can be used as the object to be driven.

The driver circuit 18 is a pre-driver for driving the bridge circuit 10. To be specific, the driver circuit 18 outputs drive signals for driving the high-side transistors and the low-side transistor of the bridge circuit 10. For example, the driver circuit 18 outputs a first drive signal to the gates of the high-side transistors of the bridge circuit 10, and output a second drive signal to the gates of the low-side transistors of the bridge circuit 10.

The analog circuit 28 is a circuit for processing an analog signal in the circuit apparatus according to the present embodiment. The analog circuit 28 includes a detection circuit 30 and the like shown in FIG. 4, which will be described later. The analog circuit 28 can include a reference voltage generation circuit, a bias current generation circuit, an oscillator circuit, and the like.

The control circuit 20 is a circuit for processing, for example, a digital signal (logic signal) in the circuit apparatus according to the present embodiment. For example, the control circuit 20 performs control so as to turn the high-side transistors and the low-side transistors of the bridge circuit 10 on and off. The control circuit 20 also performs processing for performing overall control on the circuit apparatus.

In the present embodiment, the circuit apparatus includes the bridge circuit 10, at least one temperature sensor unit TS and an overheating detection unit OHD. The temperature sensor unit TS performs temperature detection, and outputs a temperature detection signal. For example, the temperature sensor unit TS detects the temperature of the location where the temperature sensor unit TS is disposed, and outputs a voltage signal that varies according to the temperature as a temperature detection signal. The overheating detection unit OHD performs overheating detection based on the temperature detection signal from the temperature sensor unit TS. For example, the overheating detection unit OHD determines whether or not a temperature corresponding to the temperature detection signal has reached a temperature at which it is determined that an overheating state has occurred. If it is determined that an overheating state has occurred, for example, an overheating protection operation of turning off the high-side transistors and the low-side transistors of the bridge circuit 10 is performed. For example, if it is determined that an overheating state has occurred, the overheating detection unit OHD outputs a shutdown signal (overheating detection signal) to the control circuit 20, and the control circuit 20 that has received the shutdown signal performs control so as to turn off the high-side transistors and the low-side transistors of the bridge circuit 10.

As described above, by providing the temperature sensor unit TS and the overheating detection unit OHD in the circuit apparatus according to the present embodiment, the circuit apparatus can detect an overcurrent flowing through the bridge circuit 10 if it occurs. In addition, the circuit apparatus according to the present embodiment implements an overheating protection operation by turning off the transistors of the bridge circuit 10 so as to stop driving the object to be driven by the bridge circuit 10 such as a motor.

However, if the temperature detection performed by the temperature sensor unit TS delays, a problematic situation may occur in which the circuit apparatus is broken due to overheating, before the overheating protection operation is performed.

Figure 2:
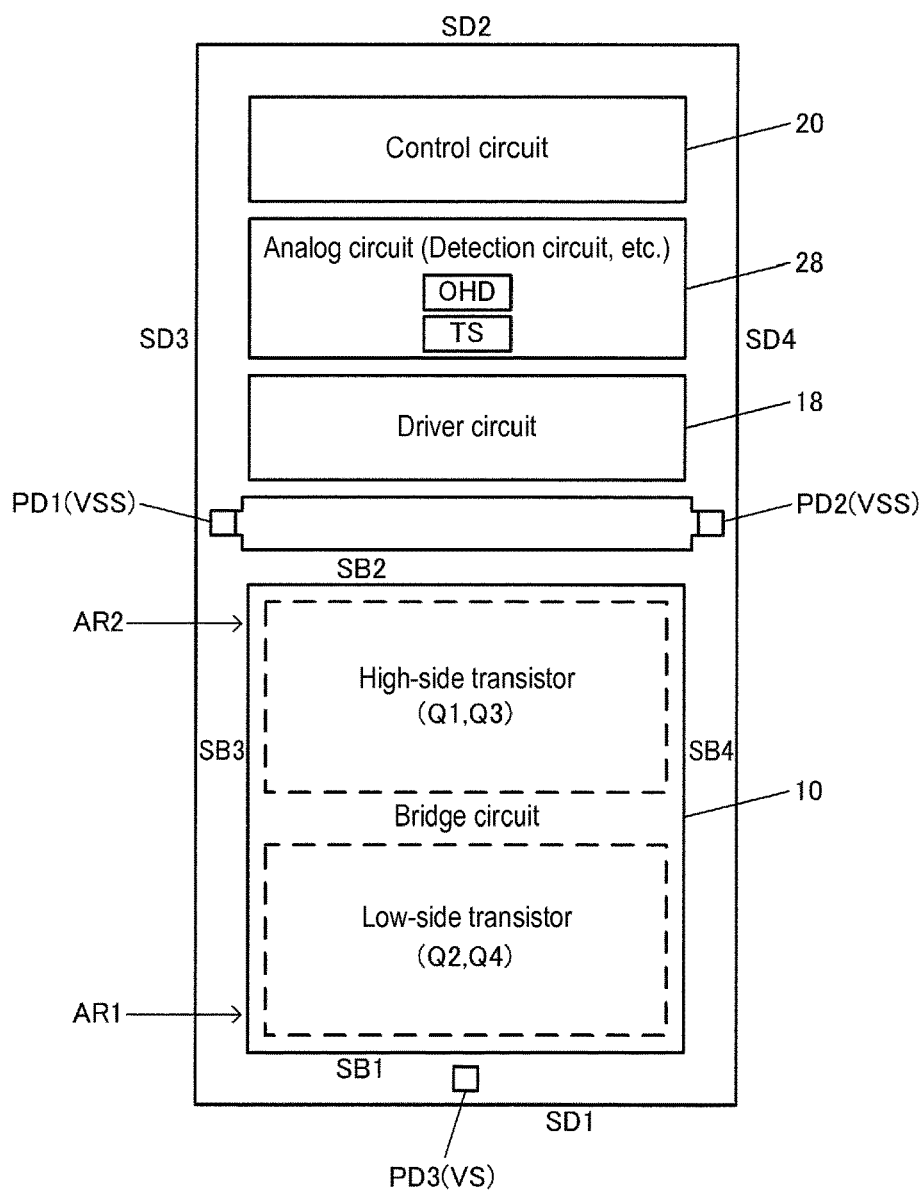
FIG. 2 shows an example arrangement of a temperature sensor unit according to a comparative example of the embodiment.

For example, FIG. 2 shows an example arrangement of the temperature sensor unit TS according to a comparative example in the embodiment. In the comparative example shown in FIG. 2, the temperature sensor unit TS and the overheating detection unit OHD are disposed in an arrangement area of the analog circuit 28. The temperature sensor unit TS and the overheating detection unit OHD are circuits for processing analog signals, and are operated by receiving supply of power for analog circuits. For this reason, the temperature sensor unit TS and the overheating detection unit OHD are disposed in the arrangement area of the analog circuit 28, rather than in the arrangement area of the control circuit 20 or the driver circuit 18. Also, as will be described later, the high-side transistors and the low-side transistors constituting the bridge circuit 10 are implemented by high breakdown voltage transistors (DMOS). On the other hand, temperature detection elements (bipolar transistors, diodes or the like) constituting the temperature sensor unit TS are not required to have a high breakdown voltage. Accordingly, hitherto, a configuration in which the temperature sensor unit TS is disposed in an arrangement area of the bridge circuit 10 has not been used.

On the other hand, in a circuit apparatus that drives the object to be driven such as a motor, a large current (for example, several hundred mA to several A) flows through the bridge circuit 10 constituted by high breakdown voltage transistors. Accordingly, if a problem occurs in the transistors of the bridge circuit 10 and an overcurrent flows through the bridge circuit 10, overheating caused by the overcurrent leads to breakage of the transistors, deterioration in reliability or the like.

However, in the arrangement of the comparative example shown in FIG. 2, the temperature sensor unit TS is disposed at a great distance from the bridge circuit 10 that is likely to be the source of overheating. Accordingly, if an overheating state occurs as a result of an overcurrent flowing through the bridge circuit 10, the temperature detection performed by the temperature sensor unit TS delays. The delay in temperature detection delays the start of an overheating protection operation performed by the overheating detection unit OHD, and as a result, the transistors in the bridge circuit 10 may be broken by overheating due to an overcurrent.

To address the above problem, in the present embodiment, as shown in FIG. 1, the temperature sensor unit TS is disposed (layout arrangement) in a position at a short distance from the bridge circuit 10. To be specific, the temperature sensor unit TS is disposed in a position closer to the bridge circuit 10 than the overheating detection unit OHD is. For example, the temperature sensor unit TS is disposed in a position closer to the bridge circuit 10 than the overheating detection unit OHD is, as viewed in a direction perpendicular to the substrate of the circuit apparatus. In other words, the temperature sensor unit TS is disposed in a position closer to the bridge circuit 10 than the driver circuit 18.

It is assumed that, for example, the distance between the temperature sensor unit TS and the bridge circuit 10 is denoted by LA1, and the distance between the overheating detection unit OHD and the bridge circuit 10 is denoted by LA2. In this case, in the present embodiment, the temperature sensor unit TS is disposed in a position that satisfies LA1<LA2. If it is assumed that the distance between the driver circuit 18 and the bridge circuit 10 is denoted by LA3, the temperature sensor unit TS is disposed in a position that satisfies LA1<LA3. The distance between circuits (blocks) can be, for example, the distance between center positions (representative position) of circuits (blocks). As used herein, "center position" refers to the center position of four vertices (a plurality of vertices) in the case of a rectangular (polygonal) circuit (block).

In FIG. 1, a direction extending from a first side SD1 of the circuit apparatus (semiconductor chip) toward an opposing second side SD2 is defined as a first direction DR1, and a direction opposite to the first direction DR1 is defined as a second direction DR2. Furthermore, a direction extending from a third side SD3 of the circuit apparatus toward an opposing fourth side SD4 is defined as a third direction DR3, and a direction opposite to the third direction DR3 is defined as a fourth direction DR4. The third and fourth directions DR3 and DR4 are directions that intersect (are perpendicular to) the first and second directions DR1 and DR2.

In this case, in FIG. 1, the driver circuit 18 is provided on the first direction DR1 side of the bridge circuit 10, and the analog circuit 28 is provided on the first direction DR1 side of the driver circuit 18. Also, the control circuit 20 is provided on the first direction DR1 side of the analog circuit 28. Then, in the first direction DR1, the temperature sensor unit TS is disposed in a position closer to the bridge circuit 10 than the overheating detection unit OHD is.

As described above, in the present embodiment, the temperature sensor unit TS is disposed in a position close to the bridge circuit 10. Accordingly, if an overheating state occurs as a result of an overcurrent flowing through the bridge circuit 10, the temperature sensor unit TS disposed in a position close to the bridge circuit 10 detects the temperature in the overheating state in a short time. Then, upon immediately starting an overheating protection operation performed by the overheating detection unit OHD, the transistors of the bridge circuit 10 are turned off, and the flow of overcurrent is stopped. As a result, it is possible to effectively suppress the occurrence of problematic situations such as the circuit apparatus (IC) being broken by overheating due to the overcurrent flowing through the bridge circuit 10, and the reliability being reduced. That is, it is possible to implement stable motor drive control that drives the object to be driven such as a motor in a stable manner by actuating the overheating protection function in a short time so as to prevent overheating that can lead to breakage of the circuit apparatus or the like.

Also, in FIG. 1, the temperature sensor unit TS is disposed in the arrangement area of the bridge circuit 10. As used herein, the expression "the temperature sensor unit TS is disposed in the arrangement area of the bridge circuit 10" means, for example, that the high-side transistors and the low-side transistors constituting the bridge circuit 10 are disposed in at least two (three or four) adjacent areas around the temperature detection elements (bipolar transistors, diodes or the like) of the temperature sensor unit TS. In other words, the bridge circuit 10 are disposed an area adjacent to the temperature detection elements in two orthogonal directions. That is, in the position in which the temperature sensor unit TS is disposed, the high-side transistors and the low-side transistors of the bridge circuit 10 are not formed, but the temperature detection elements are formed. Then, the transistors of the bridge circuit 10 are formed around (in adjacent areas of) the temperature detection elements. For example, in FIG. 1, the temperature detection elements are formed in the arrangement area of the temperature sensor unit TS, and the transistors of the bridge circuit 10 are formed in, for example, adjacent areas on the second direction DR2 side, the third direction DR3 side and the fourth direction DR4 side of the temperature detection elements.

By disposing the temperature sensor unit TS in the arrangement area of the bridge circuit 10, overheating due to an overcurrent in the transistors of the bridge circuit 10 can be detected at the shortest time. That is, as a result of the temperature in the overheating state being detected immediately, the overheating protection operation can be started at the shortest time. Accordingly, the breakage of transistors by overheating and the deterioration in reliability can be suppressed more effectively.

Figure 19:
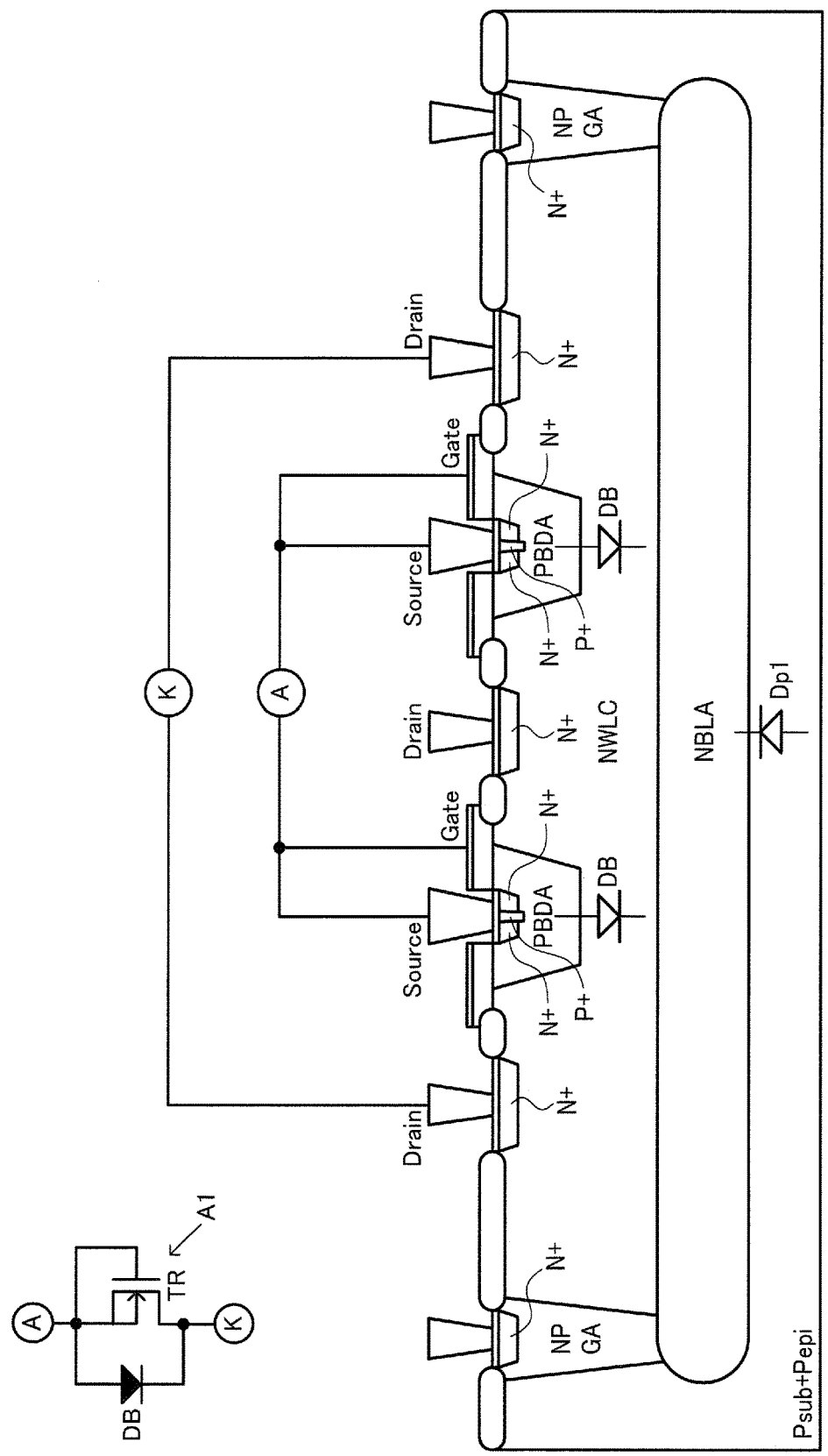
FIG. 19 is an example of implementation of a temperature detection element of a temperature sensor unit that uses a DMOS structure.

The high-side transistors and the low-side transistors of the bridge circuit 10 are formed by transistors having a higher breakdown voltage than the transistors constituting the control circuit 20 or the like. To be specific, the transistors of the bridge circuit 10 are DMOS (Double-diffused Metal Oxide Semiconductor) transistors. In the case where the temperature sensor unit TS is formed by a high breakdown voltage transistor process (DMOS process), in the arrangement area of the temperature sensor unit TS, the temperature detection elements are formed by the high breakdown voltage transistor process. For example, as shown in FIG. 19 described later, in the temperature sensor unit TS, the temperature detection elements are formed by body diodes DB of DMOS transistors.

Figure 3:
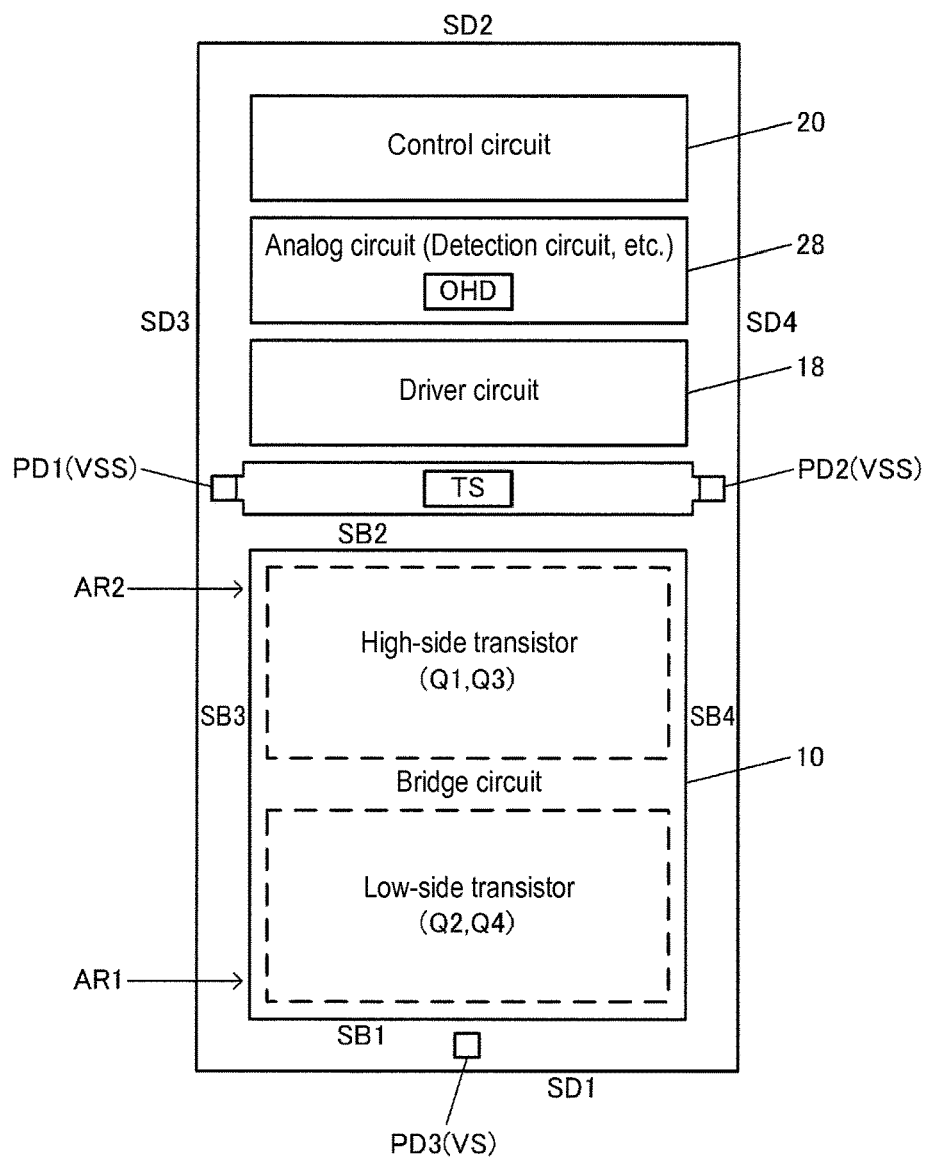
FIG. 3 shows another example arrangement of the temperature sensor unit.
Figure 3:
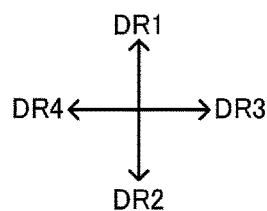

Also, in FIG. 1, the temperature sensor unit TS is disposed within the arrangement area of the bridge circuit 10, but as shown in FIG. 3, the temperature sensor unit TS may be disposed outside the arrangement area of the bridge circuit 10 (around the arrangement area). For example, in FIG. 3, the temperature sensor unit TS is disposed under a power supply line connected to pads PD1 and PD2 for a low potential-side power supply VSS described later. Even when the temperature sensor unit TS is disposed outside the bridge circuit 10, by disposing the temperature sensor unit TS at a short distance from the bridge circuit 10, it is possible to detect overheating due to an overcurrent flowing through the bridge circuit 10 in a short time, and suppress breakage of transistors by overheating, and deterioration in reliability. Also, in FIG. 3, the temperature sensor unit TS is disposed under the power supply VSS. This enables the power supply VSS to be supplied at a low impedance to the temperature sensor unit TS, and thus the deterioration in detection accuracy of overheating detection caused by noise, which will be described later, can be effectively suppressed.

Also, in FIG. 1, in the arrangement area of the bridge circuit 10, an area extending along a first side SB1 located far from the overheating detection unit OHD (driver circuit, control circuit) is defined as a first side area AR1. An area extending along a second side SB2 located close to the overheating detection unit OHD (driver circuit, control circuit) is defined as a second side area AR2. The first side area AR1 is a side area located on the first direction DR1 side with respect to the center position of the bridge circuit 10. The second side area AR2 is a side area located on the second direction DR2 side with respect to the center position of the bridge circuit 10. The first and second side areas AR1 and AR2 are areas having a predetermined width within the sides.

In this case, in FIG. 1, the temperature sensor unit TS is disposed in the second side area AR2. That is, the temperature sensor unit TS is disposed in the area located on the first direction DR1 side with respect to the center position (representative position) of the bridge circuit 10.

Also, as shown in FIG. 1, the circuit apparatus includes pads PD1 and PD2 for low potential-side power supply that receive the low potential-side power supply VSS (for example, GND). For example, the pad PD1 is disposed in an I/O area extending along the third side SD3 of the circuit apparatus (semiconductor chip). The pad PD2 is disposed in an I/O area extending along the fourth side SD4 opposing the third side SD3 of the circuit apparatus. For example, in FIG. 1, a pad PD3 is a pad for electrically connecting to one end of a sense resistor RS shown in FIG. 4 described later, and is connected to the sources of the low-side transistors Q2 and Q4 and set to a voltage VS. Accordingly, in an I/O area extending along the first side SD1 of the circuit apparatus, no pad for the power supply VSS is disposed, and the pad PD3 for the sense resistor RS is disposed. The pads PD1 and PD2 for the power supply VSS are respectively disposed in I/O areas extending along the third and fourth sides SD3 and SD4 of the circuit apparatus.

The pads PD1 and PD2 are connected by a power supply line for supplying the low potential-side power supply VSS. The VSS power supply line is provided in an area between the bridge circuit 10 and the driver circuit 18. Under the power supply line, a guard area for setting the substrate of the circuit apparatus to a substrate potential (for example, VSS=GND) can be formed.

Then, in FIG. 1, the temperature sensor unit TS is disposed in a position closer to the pads PD1 and PD2 for the low potential-side power supply VSS than the low-side transistors of the bridge circuit 10 are. For example, if it is assumed that the distance between the temperature sensor unit TS and the pad PD1 (PD2) is denoted by LB1, and the distance between the bridge circuit 10 and the pad PD1 (PD2) is denoted by LB2, the temperature sensor unit TS is disposed in a position that satisfies LB1<LB2. In FIG. 1, the temperature sensor unit TS is disposed in a position equidistant (substantially equidistant) from the pads PD1 and PD2, but the temperature sensor unit TS may be disposed in a position closer to the pad PD1 than the pad PD2, or may be disposed in a position closer to the pad PD2 than the pad PD1.

Figure 4:
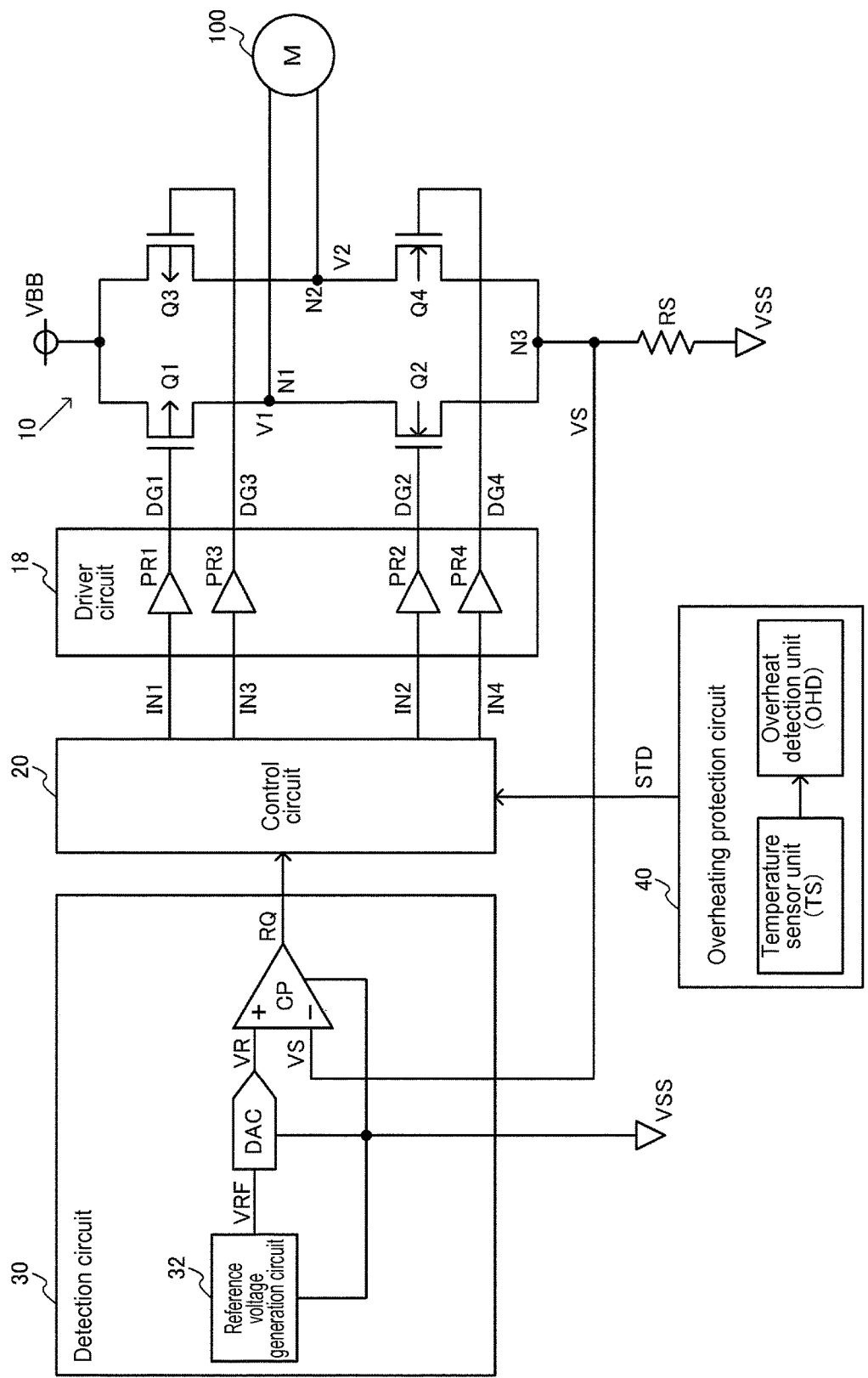
FIG. 4 shows an example of a circuit configuration of the circuit apparatus according to the embodiment.
Figure 5A:
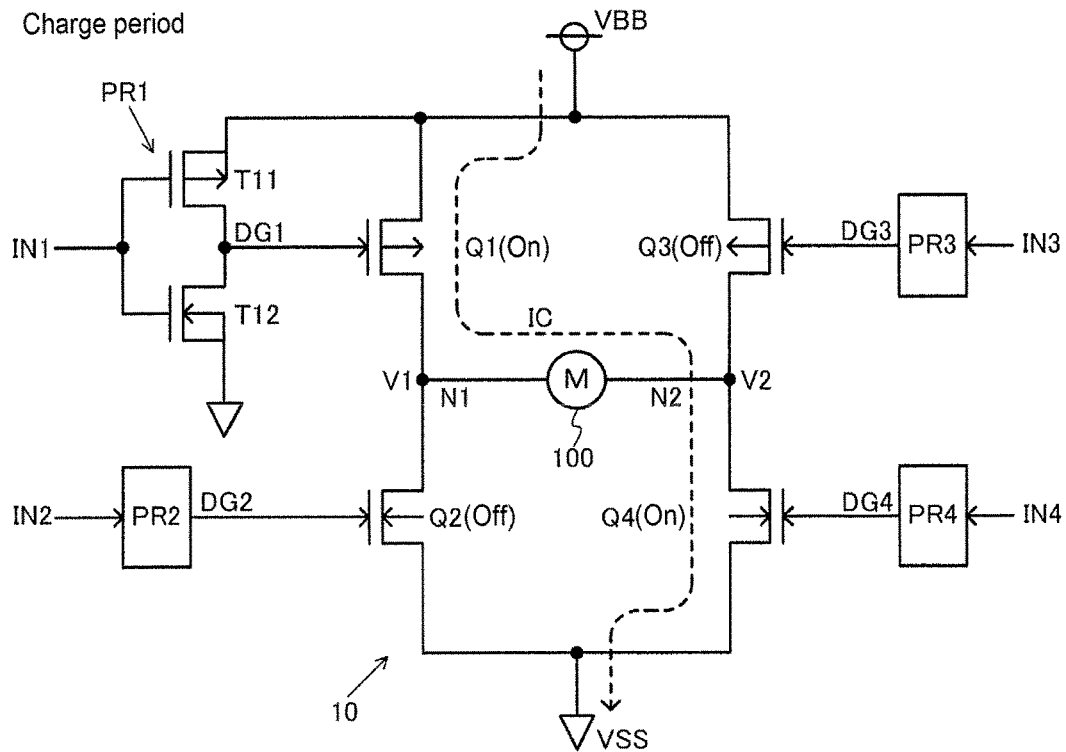
FIGS. 5A and 5B are diagrams illustrating operations of a bridge circuit.
Figure 5B:
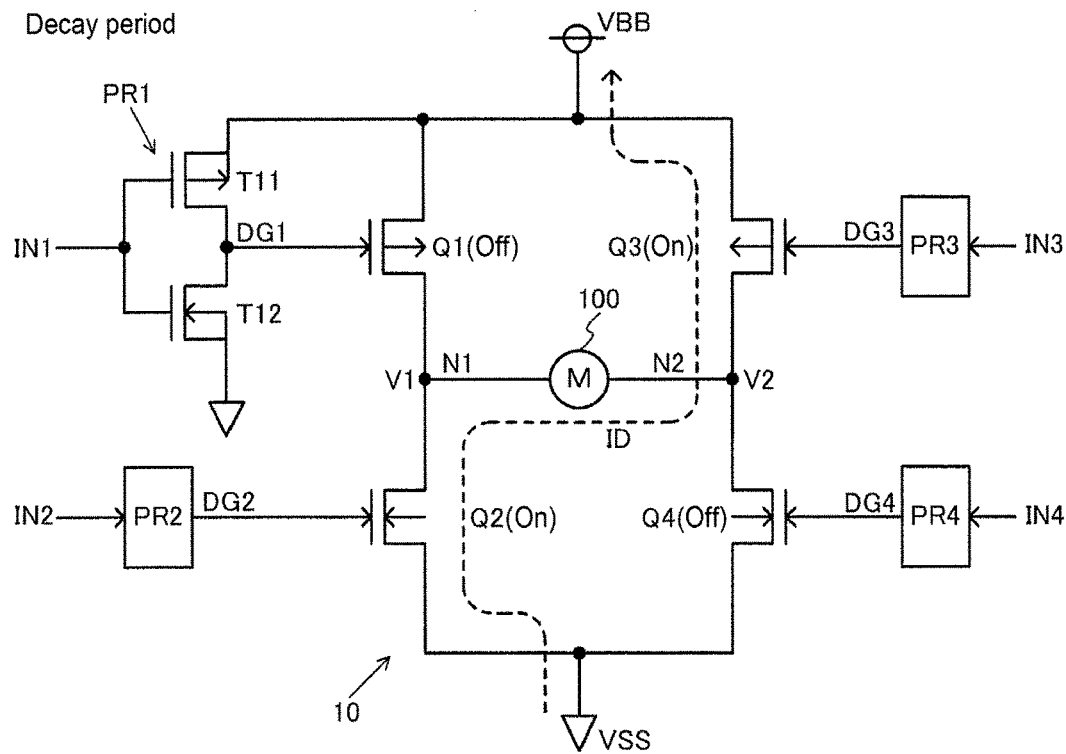
Figure 6:
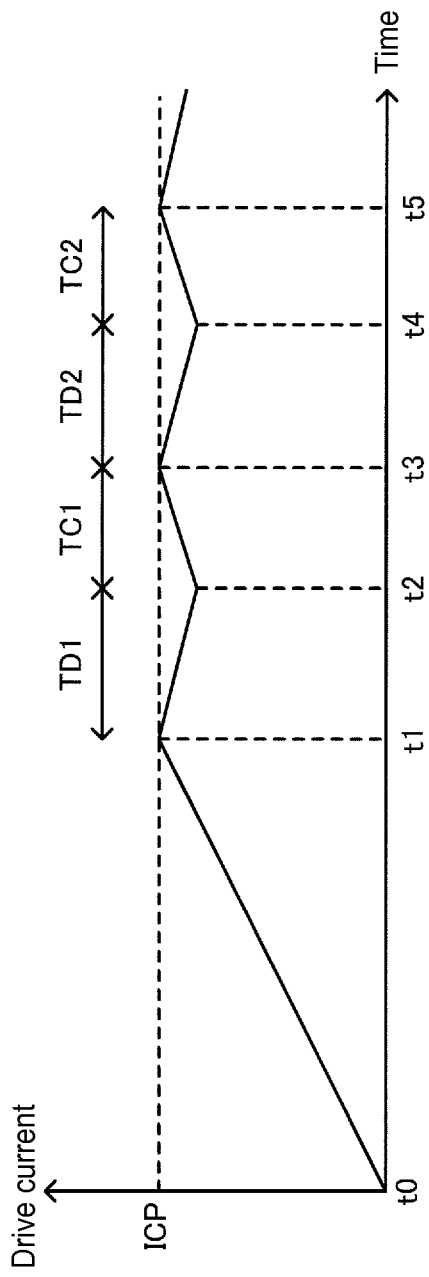
FIG. 6 is a diagram illustrating a method for controlling a chopping operation using a sense resistor.

As shown in FIGS. 4 to 6 described later, in the bridge circuit 10, large noise is generated during a switching period between a charge period and a decay period. If such noise is generated, the accuracy of overheating detection is reduced. For example, in FIGS. 7 and 8 described later, the point where a temperature detection voltage VTD of the temperature sensor unit TS and a reference voltage VREF crosses is determined as an overheating state temperature, but if large noise is generated in the bridge circuit 10, the accuracy of overheating detection is reduced. If, for example, the temperature detection voltage VTD of the temperature sensor unit TS fluctuates due to noise generated in the bridge circuit 10, the accuracy of overheating detection is reduced. Accordingly, it is desirable to supply the power supply VSS (GND) at a low impedance to the temperature sensor unit TS as much as possible. Also, in the bridge circuit 10, the low-side transistors are more likely to be the source of large noise than the high-side transistors. For this reason, it is desirable to have a configuration in which the noise of the low-side transistors is not transmitted to the temperature sensor unit TS as much as possible.

In this regard, in FIG. 1, the temperature sensor unit TS is disposed in the second side area AR2 of the bridge circuit 10. That is, the temperature sensor unit TS is disposed in a position close to the pads PD1 and PD2 for the power supply VSS. Accordingly, the power supply VSS (GND) can be supplied at a low impedance to the temperature sensor unit TS. As a result, even if large noise is generated in the bridge circuit 10, the deterioration in the accuracy of overheating detection caused by the noise can be minimized, and the overheating protection/detection performance can be enhanced. Also, in FIG. 1, the temperature sensor unit TS is disposed in the second side area AR2 of the bridge circuit 10. That is, the temperature sensor unit TS is disposed in a position far from the low-side transistors than the high-side transistors. Accordingly, even if large noise is generated in the low-side transistors, because the temperature sensor unit TS is disposed in a position far from the noise source, it is possible to minimize the transmission of the noise to the temperature sensor unit TS. As a result, even if large noise is generated in the low-side transistors, the deterioration in the accuracy of overheating detection caused by the noise can be minimized, and the overheating protection/detection performance can be enhanced.

For example, as described above, in the I/O area extending along the first side SD1 of the circuit apparatus, which is located close to the low-side transistors, the pad PD 3 for electrically connecting to one end of the sense resistor RS is disposed, but no pad for the power supply VSS is disposed. For this reason, if the temperature sensor unit TS is disposed in the first side area AR1, it creates a problem in that it is difficult to supply the power supply VSS at a low impedance, but this problem can be solved by disposing the temperature sensor unit TS in the second side area AR2.

Also, the circuit apparatus according to the present embodiment includes the driver circuit 18 that outputs drive signals to the high-side transistors and the low-side transistors of the bridge circuit 10. The circuit apparatus according to the present embodiment also includes the control circuit 20 that performs control so as to turn the high-side transistors and the low-side transistors of the bridge circuit 10 on and off. The temperature sensor unit TS is disposed in a position closer to the bridge circuit 10 than the driver circuit 18 is. Also, the temperature sensor unit TS is disposed in a position closer to the bridge circuit 10 than the control circuit 20 is. That is, the temperature sensor unit TS is disposed such that the distance between the temperature sensor unit TS and the bridge circuit 10 is shorter than the distance between the driver circuit 18 and the bridge circuit 10 or the distance between the control circuit 20 and the bridge circuit 10. With this configuration, the temperature sensor unit TS is disposed on the second direction DR2 side, which is closer to the bridge circuit 10 than the driver circuit 18 and the control circuit 20 are, and thus the distance between the temperature sensor unit TS and the bridge circuit 10 can be shortened. Accordingly, in the event of an overheating state due to an overcurrent flowing through the bridge circuit 10, the temperature can be detected by the temperature sensor unit TS located at a short distance from the bridge circuit 10, and thus the overheating protection/detection performance can be enhanced, and an appropriate overheating protection operation can be implemented.

2. Detailed Example of Circuit Configuration

FIG. 4 shows a detailed example of a circuit configuration of the circuit apparatus according to the present embodiment. A circuit apparatus shown in FIG. 4 includes a bridge circuit 10, a driver circuit 18, a control circuit 20, a detection circuit 30, and an overheating protection circuit 40. The circuit apparatus of the present embodiment is not limited to the configuration shown in FIG. 4, and various variations can be made such as omitting some of the constituent elements or adding other constituent elements.

The bridge circuit 10 includes high-side transistors Q1 and Q3 and low-side transistors Q2 and Q4. The bridge circuit 10 is a circuit that outputs a drive current to a motor 100 (for example, a DC motor), and has an H-bridge circuit configuration in FIG. 4. The high-side transistors Q1 and Q3 are, for example, P-type (in a broad sense, "first conductivity type") transistors, and the low-side transistors Q2 and Q4 are, for example, N-type (in a broad sense, "second conductivity type") transistors. As used herein, "high-side transistor" refers to a transistor that is connected to a higher potential power supply side than a low-side transistor. "Low-side transistor" refers to a transistor that is connected to a lower potential power supply side than a high-side transistor. All of the transistors Q1, Q2, Q3 and Q4 may be N-type transistors. Also, an unshown body diode (parasitic diode) is present between the source and the drain of the transistors Q1, Q2, Q3 and Q4.

The sources of the high-side transistors Q1 and Q3 are connected to a node of the high potential-side power supply VBB (first power supply). The sources of the low-side transistors Q2 and Q4 are connected to a node N3 to which one end of the sense resistor RS is connected. The node N3 is connected to, for example, one end of the sense resistor RS, which is an external component, via a terminal of the circuit apparatus.

The drain of the transistor Q1 and the drain of the transistor Q2 are connected to a node N1 that is connected to one end of the external motor 100 (in a broad sense, "object to be driven"). The node N1 is connected to one end of the external motor 100 via a terminal of the circuit apparatus.

The drain of the transistor Q3 and the drain of the transistor Q4 are connected to a node N2 that is connected to the other end of the motor 100. The node N2 is connected to the other end of the motor 100 via a terminal of the circuit apparatus.

The detection circuit 30 detects a current flowing through the bridge circuit 10. The detection circuit 30 detects, for example, a charge current during a charge period by detecting the voltage VS at one end of the sense resistor RS. The detection circuit 30 detects the charge current by detecting, for example, a voltage difference between the voltage VS and the voltage (for example, GND) of the low potential-side power supply VSS (a voltage difference between the voltage at one end of the sense resistor RS and the voltage at the other end of the same). The detection circuit 30 may be configured to include a first detection circuit that detects the voltage difference between the voltage VS and the voltage of VSS and a second detection circuit that detects the voltage VS.

The detection circuit 30 includes a reference voltage generation circuit 32, a D/A conversion circuit DAC, and a comparison circuit CP (comparator). The reference voltage generation circuit 32 generates a reference voltage VRF, which is a constant voltage. The D/A conversion circuit DAC generates, upon receiving the reference voltage VRF, a reference voltage VR that is changed variably based on setting data. The comparison circuit CP receives an input of the reference voltage VR at a first input terminal (non-inverting input terminal) thereof, receives an input of the voltage VS, which is the voltage at one end of the sense resistor RS, at a second input terminal (inverting input terminal) thereof, and outputs a detection result signal RQ. For example, as will be described later, a chopping current is determined by the reference voltage VR input into the comparison circuit CP, and thus the torque of the motor 100 can be controlled by changing the reference voltage VR by using the D/A conversion circuit DAC.

The control circuit 20 performs control so as to turn the high-side transistors Q1 and Q3 and the low-side transistors Q2 and Q4 on and off based on the result of detection performed by the detection circuit 30. To be specific, the control circuit 20 generates control signals IN1, IN2, IN3 and IN4 as PWM signals based on the detection result signal RQ from the detection circuit 30. The length of the charge period is controlled by the control signals IN1, IN2, IN3 and IN4.

The driver circuit 18 buffers the control signals IN1, IN2, IN3 and IN4 from the control circuit 20, and outputs drive signals DG1, DG2, DG3 and DG4 to the gates of the transistors Q1, Q2, Q3 and Q4. The driver circuit 18 includes pre-drivers PR1, PR2, PR3 and PR4 that buffer the control signals IN1, IN2, IN3 and IN4 and output the drive signals DG1, DG2, DG3 and DG4.

The overheating protection circuit 40 includes a temperature sensor unit TS and an overheating detection unit OHD, and performs an overheating protection operation. For example, the overheating protection circuit 40 outputs a shutdown signal STD to the control circuit 20 if it is determined based on a result of temperature detection performed by the temperature sensor unit TS that the temperature has reached a setting temperature (for example, 150 degrees Celsius) at which an overheating protection (overheating detection) operation starts. Then, the control circuit 20 that has received the shutdown signal STD implements overheating protection by performing control so as to, for example, turn off the transistors Q1 to Q4 of the bridge circuit 10 to shut down the bridge circuit 10. By doing so, if heat generated in the bridge circuit 10 or the like abnormally rises for any reason, the bridge circuit 10 can be appropriately shut down. It is also possible to implement the overheating protection operation by providing an overheating protection transistor between the gate and the source of each of the transistors Q1 to Q4 of the bridge circuit 10, and, if it is determined that the temperature has reached the setting temperature for starting overheating protection, turning on the overheating protection transistors.

Next, operations performed by the bridge circuit 10 of the circuit apparatus according to the present embodiment will be described with reference to FIGS. 5A and 5B.

As shown in FIG. 5A, during a charge period, the transistors Q1 and Q4 are turned on. As a result, a charge current IC flows from the high potential-side power supply VBB to the low potential-side power supply VSS (GND) via the transistor Q1, the motor 100 (motor coil) and the transistor Q4.

During a decay period, on the other hand, as shown in FIG. 5B, the transistors Q2 and Q3 are turned on, and a decay current ID flows from the power supply VSS to the power supply VBB via the transistor Q2, the motor 100 and the transistor Q3. The charge current IC and the decay current ID both flow from a positive-side terminal to a negative-side terminal of the motor 100.

Then, as shown in FIG. 4, the sense resistor RS is provided between the node N3 to which the sources of the transistors Q2 and Q4 are connected and a node of the power supply VSS, and the comparison circuit CP compares the voltage VS of the node N3 with the reference voltage VR. Then, as shown in FIG. 6, the control circuit 20 controls a chopping operation that maintains a chopping current ICP flowing through the bridge circuit 10 at a constant level. To be specific, the control circuit 20 controls the pulse width of the PWM signals (IN1 to IN4) such that the chopping current ICP is constant, and the transistors Q1 to Q4 are controlled so as to be on and off based on the PWM signals.

For example, if driving of the motor 100 starts at timing t0 shown in FIG. 6, the motor enters the charge period shown in FIG. 5A, and the transistors Q1 and Q4 are turned on, and the transistors Q2 and Q3 are turned off. As a result, the drive current (the charge current IC) flows from the power supply VBB to the power supply VSS via the transistor Q1, the motor 100 and the transistor Q4. Then, at timing t1 at which the drive current of the motor 100 reaches the chopping current ICP, the period is switched to a decay period TD1. To be specific, if the drive current increases and the voltage VS of the node N3 exceeds the reference voltage VR, the comparison result signal RQ of the comparison circuit CP rises from a low level to a high level, and the period is switched to the decay period TD1 at the timing t1. The drive current of the motor 100 at the timing t1 is the chopping current ICP, from which it can be seen that the chopping current ICP is detected upon detection of the voltage VS.

When the period is switched to the decay period TD1, as shown in FIG. 5B, the transistors Q2 and Q3 are turned on, and the transistors Q1 and Q4 are turned off. As a result, the drive current (the decay current ID) flows from the power supply VSS to the power supply VBB via the transistor Q2, the motor 100 and transistor Q3. During the decay period TD1, as shown in FIG. 6, the drive current of the motor 100 decreases over time.

Then, the control circuit 20 detects, by using, for example, a timer (counter circuit) or the like, that a predetermined length of time has passed from the start of the decay period TD1, and switches the period from the decay period TD1 to a charge period TC1. During the charge period TC1, the drive current of the motor 100 increases, and when the drive current of the motor 100 reaches the chopping current ICP, the charge period TC1 is switched again to a decay period TD2. Thereafter, by repeating this processing, control is performed so as to maintain the chopping current ICP, which is a peak current of the drive current, to be constant, and thereby to maintain the rotation speed of the motor 100 to be constant.

In the foregoing description, an example was described in which the bridge circuit 10 is an H-bridge type circuit, but the present embodiment is not limited thereto, and the bridge circuit 10 may be a half-bridge type circuit. In this case, the transistors Q3 and Q4 are not provided as the bridge circuit 10, and only the transistors Q1 and Q2 are provided. Also, in the foregoing description, an example was described in which the circuit apparatus is a motor driver for driving the motor 100, but the object to be driven by the circuit apparatus according to the present embodiment is not limited to the motor 100, and various elements and devices having inductors (coils) can be used as the object to be driven. Also, in FIG. 4, an example was described in which control is performed so as to turn the transistors Q1 to Q4 of the bridge circuit 10 on and off by detecting the voltage VS at one end of the sense resistor RS, but the present embodiment is not limited thereto. It is also possible to perform control so as to turn the transistors Q1 to Q4 on and off by, for example, detecting a current flowing through the bridge circuit 10 without using the sense resistor RS.

In the circuit apparatus shown in FIG. 4, a large current flows through the drains of the transistors Q1 to Q4 constituting the bridge circuit 10 when the bridge circuit 10 drives the motor 100 by using a chopping current. Because the large current is turned on and off by the chopping operation, and the direction in which the large current flows is reversed, the drain voltage of the transistors Q1 to Q4 of the bridge circuit 10 undergoes a large potential change. In response to the occurrence of such a potential change, the potential change becomes noise, which may cause a problem in the overheating protection operation of the overheating protection circuit 40.

For example, during the decay period shown in FIG. 5B, the decay current ID flows from the low potential-side power supply VSS to the high potential-side power supply VBB via the transistor Q2, the motor 100 and the transistor Q3. Accordingly, a negative voltage, which is a potential on the negative side with respect to the power supply VSS (GND), is applied to the drain (node N1) of the low-side transistor Q2. For this reason, a parasitic diode formed in the area of the N-type transistor Q2 is driven into a forward bias state, thereby generating noise that significantly changes the potential of the substrate. For example, the temperature sensor unit TS may be negatively affected by the noise, and appropriate overheating temperature detection cannot be implemented. That is, an overheating protection operation cannot be started despite the fact that the temperature has reached the setting temperature (for example, 150 degrees Celsius) for starting overheating protection, which may lead to a problem such as breakage of the transistors of the bridge circuit 10 or the deterioration in reliability.

In this regard, in FIG. 1, the temperature sensor unit TS is disposed in a position that is close to the pads PD1 and PD2 for the power supply VSS and is far from the low-side transistors Q2 and Q4, which may act as the source of large noise. Accordingly, even if large noise is generated in the low-side transistors Q2 and Q4, the deterioration in the accuracy of temperature detection caused by the noise can be minimized, and an appropriate overheating protection operation can be implemented.

3. Overheating Protection Circuit

Figure 7:
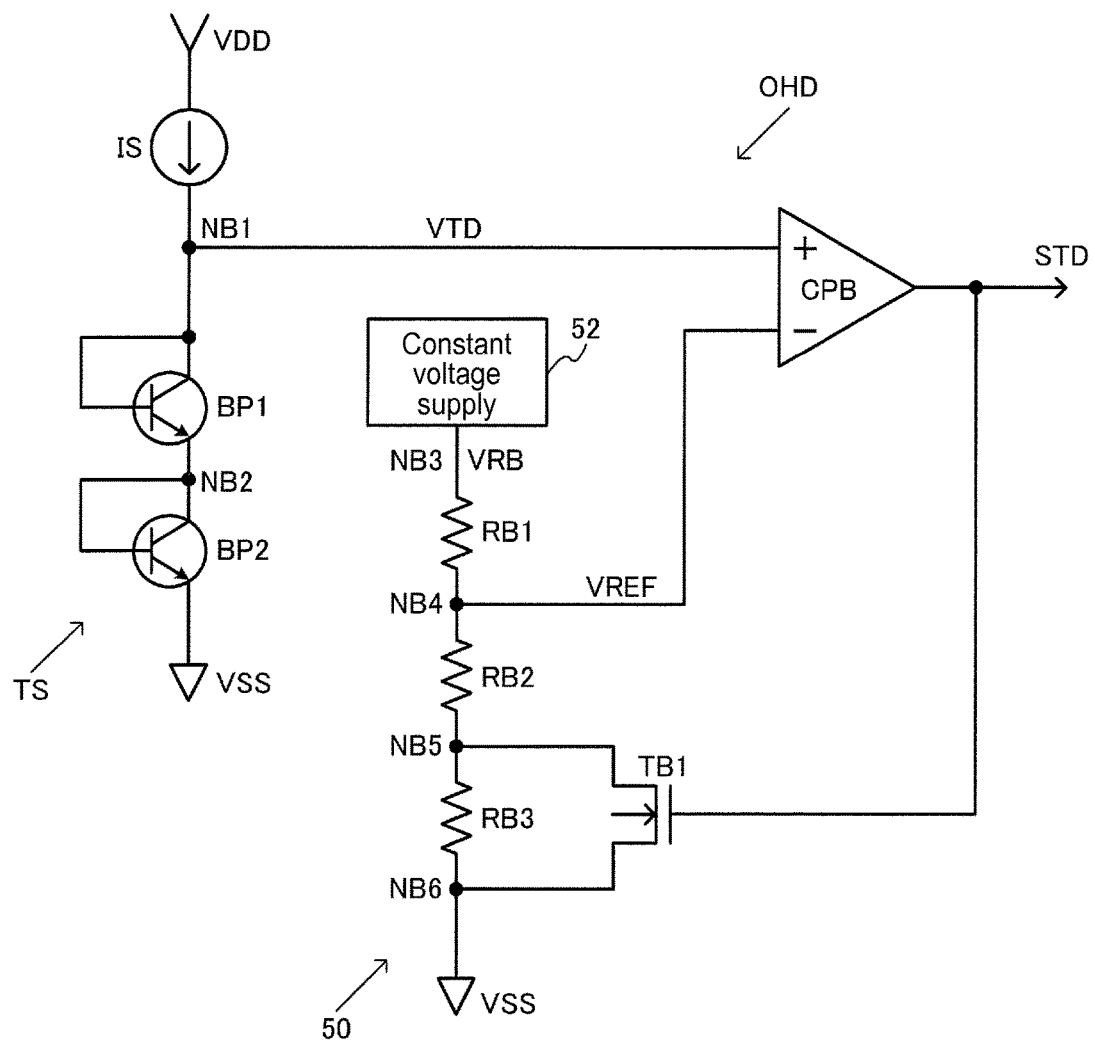
FIG. 7 shows an example configuration of a temperature sensor unit and an overheating detection unit.

FIG. 7 shows a detailed example configuration of the overheating protection circuit 40. The overheating protection circuit 40 is not limited to the configuration shown in FIG. 7, and various variations can be made such as omitting some of the constituent elements or adding other constituent elements. For example, in FIG. 7, temperature detection is performed by using bipolar transistors, but may be performed by using other temperature detection elements such as diodes.

As shown in FIG. 7, the overheating protection circuit 40 includes a temperature sensor unit TS and an overheating detection unit OHD. The temperature sensor unit TS includes a current source IS (current source circuit) and bipolar transistors BP1 and BP2. The current source IS is provided between a node of a high potential-side power supply VDD and an output node NB1 of the temperature sensor unit TS. The bipolar transistors BP1 and BP2 are provided in series between the output node NB1 of the temperature sensor unit TS and the node of the low potential-side power supply VSS. The bipolar transistors BP1 and BP2 are each in diode connection in which its collector and base are connected, and can be implemented by, for example, CMOS lateral bipolar transistors. The current source IS may be a constituent element of the temperature sensor unit TS, or may be a constituent element of the overheating detection unit OHD. That is, in FIG. 7, the temperature sensor unit TS includes at least the bipolar transistors BP1 and BP2 (in a broad sense, "temperature detection element").

The overheating detection unit OHD includes a comparison circuit CPB (comparator) and a reference voltage generation circuit 50. The comparison circuit CPB receives an input of a temperature detection voltage VTD from the temperature sensor unit TS at a first input terminal (+: non-inverting input terminal) thereof, and receives an input of a reference voltage VREF from the reference voltage generation circuit 50 at a second input terminal (−: inverting input terminal) thereof.

The reference voltage generation circuit 50 includes a constant voltage supply 52, resistors RB1, RB2 and RB3, and a transistor TB1. The constant voltage supply 52 generates a constant voltage VRB. The resistors RB1, RB2 and RB3 are provided in series between a supply node NB3 of the constant voltage VRB and a node NB6 of the power supply VSS. Then, the reference voltage VREF generated by a node NB4 between the resistors RB1 and RB2 is input into the second input terminal (−) of the comparison circuit CPB.

The N-type transistor TB1 is provided between nodes NB5 and NB6 located at both ends of the resistor RB3, and receives an input of a shutdown signal STD from the comparison circuit CPB at its gate. If the shutdown signal STD is L level, the transistor TB1 is turned off, and reference voltage VREF=VREFH=VRB×{(RB2+RB3)/(RB1+RB2+RB3)} is generated in the node NB4. If the shutdown signal STD is H level, the transistor TB1 is turned on so as to bypass the resistor RB3, and reference voltage VREF=VREFL=VRB×{(RB2/(RB1+RB2)} is generated in the node NB4. The resistance values of the resistors RB1, RB2 and RB3 are set so as to satisfy VREFH>VREFL.

Figure 8:
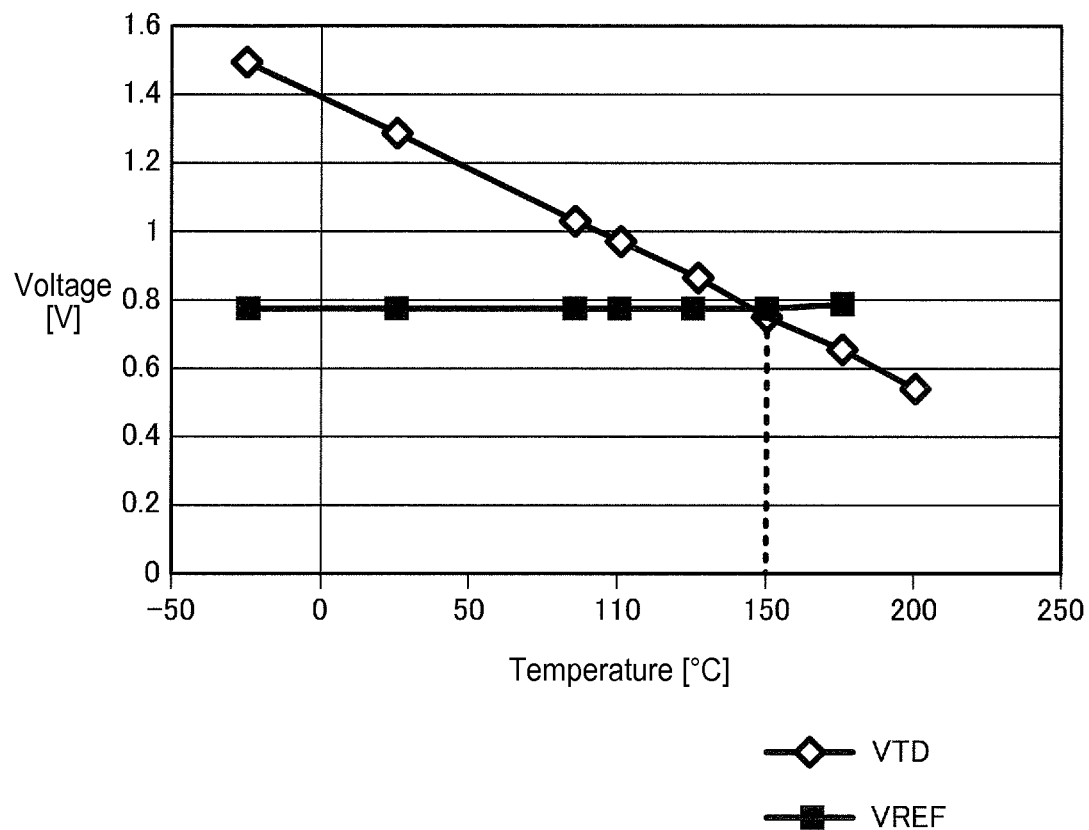
FIG. 8 is a diagram showing a relationship between temperature detection voltage and reference voltage.

FIG. 8 is a diagram showing a relationship between the temperature detection voltage VTD of the temperature sensor unit TS and the reference voltage VREF. As shown in FIG. 8, the temperature detection voltage VTD decreases as the temperature increases, and has negative temperature characteristics. The bipolar transistors BP1 and BP2 are each in diode connection in which its collector and base are connected, and a voltage Ebe between the base and the emitter has negative temperature characteristics. The temperature detection voltage is expressed by VTD=2×Ebe, and thus the temperature detection voltage VTD also has negative temperature characteristics. On the other hand, the reference voltage VREF has even (flat) temperature characteristics, which remains constant even if the temperature increases.

In FIG. 8, the setting temperature for starting overheating protection is set to, for example, 150 degrees Celsius. At a temperature lower than the setting temperature set at 150 degrees Celsius, the temperature detection voltage is greater than the reference voltage (VTD>VREF), and thus the shutdown signal STD becomes inactive (for example, H level). At a temperature exceeding the setting temperature set at 150 degrees Celsius, the temperature detection voltage is less than the reference voltage (VTD<VREF), and thus the shutdown signal STD becomes active (for example, L level). When the shutdown signal STD becomes active, the control circuit 20 executes a shutdown operation of turning off all of the transistors Q1 to Q4 of the bridge circuit 10. In this way, an overheating protection operation is implemented.

When the shutdown signal STD becomes inactive (H level), the transistor TB1 is turned on as described above, and thereby the temperature detection voltage is equal to the reference voltage (VREF=VREFL). On the other hand, when the shutdown signal STD changes from inactive to active (L level), the transistor TB1 is turned off, thereby VREF=VREFH>VREFL. As described above, in the circuit shown in FIG. 7, when the shutdown signal STD changes from inactive to active as a result of the temperature exceeding the setting temperature for starting overheating protection, the reference voltage VREF increases from VREFL to VREFH. Accordingly, the overheating protection detection can have hysteresis characteristics. As a result of having such hysteresis characteristics, even if the voltage level of the shutdown signal STD increases due to noise or the like after the temperature temporarily exceeds the setting temperature, the shutdown signal STD does not change from active to inactive, and thus noise resistance can be enhanced.

4. Arrangement of Plurality of Temperature Sensor Units

In FIG. 1, only a single temperature sensor unit is disposed, but according to the present embodiment, a plurality of temperature sensor units may be disposed in the circuit apparatus. For example, in FIG. 9, a first temperature sensor unit TS1 among a plurality of temperature sensor units is disposed in a high-side transistor arrangement area in which the high-side transistors (Q1 and Q3) of the bridge circuit 10 are disposed. A second temperature sensor unit TS2 is disposed in a low-side transistor arrangement area in which the low-side transistors (Q2 and Q4) of the bridge circuit 10 are disposed.

With this configuration, if, for example, an overheating state occurs due to an overcurrent in the high-side transistors, the overheating state can be detected in a short time by the temperature sensor unit TS1 disposed in a position close to the high-side transistors. If, on the other hand, an overheating state occurs due to an overcurrent in the low-side transistors, the overheating state can be detected in a short time by the temperature sensor unit TS2 disposed in a position close to the low-side transistors.

For example, in the arrangement configuration shown in FIG. 1, if an overheating state occurs due to an overcurrent in the low-side transistors, because the overheating state needs to be detected by the temperature sensor unit TS disposed in a position relatively far from the low-side transistors, a problematic situation may occur such as detection of the overheating state being delayed. In this regard, according to the arrangement configuration shown in FIG. 9, overheating in the low-side transistors can be detected by the temperature sensor unit TS2 disposed at a short distance from the low-side transistors, and thus the occurrence of a problematic situation as described above can be suppressed.

Figure 9:
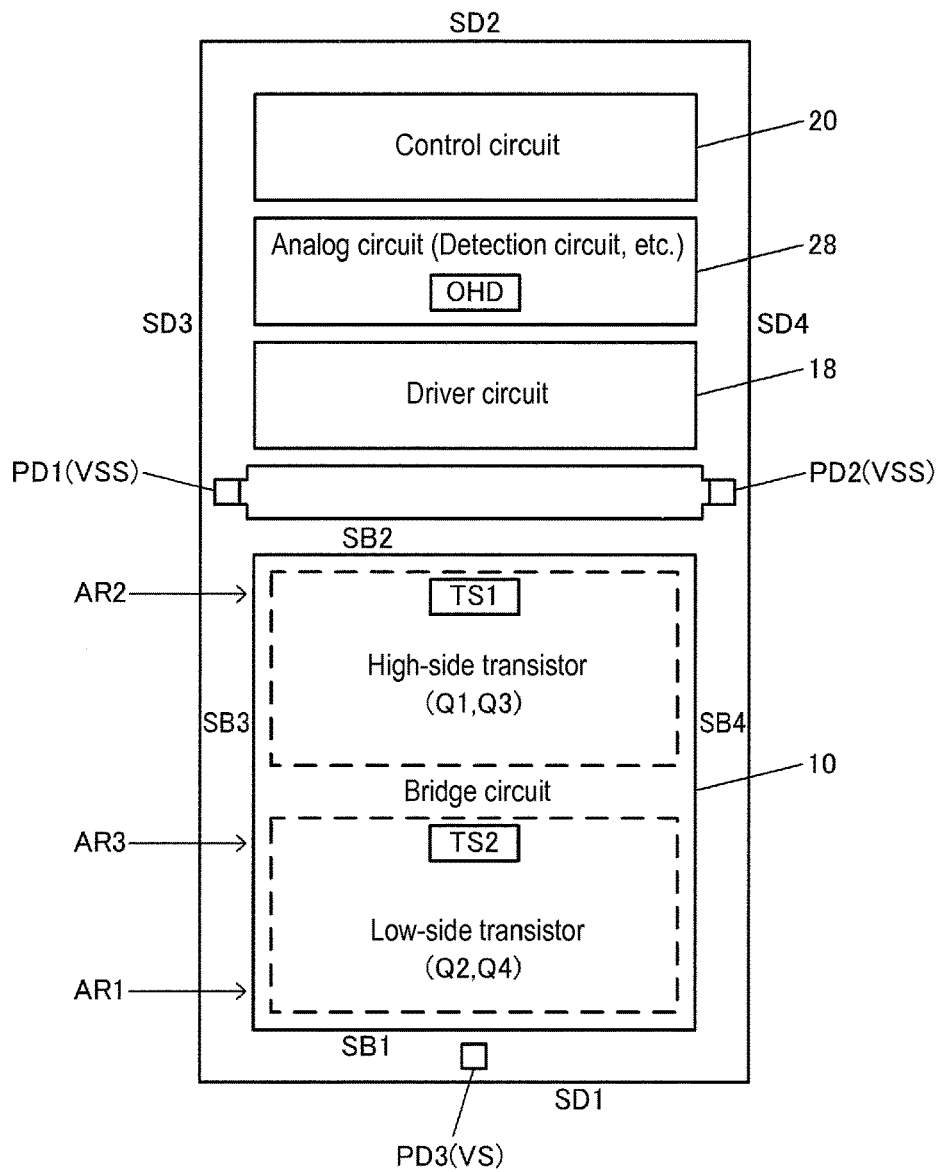
FIG. 9 shows an example arrangement in the case where a plurality of temperature sensor units are disposed.

Also, by disposing the temperature sensor unit TS1 in the high-side transistor arrangement area and the temperature sensor unit TS2 in the low-side transistor arrangement area as shown in FIG. 9, the temperature in each arrangement area can be individually detected and stored. For example, the results of overheating state detection performed by the temperature sensor units TS1 and TS2 may be stored in an unshown storage unit provided in the circuit apparatus. With this configuration, it is possible to identify, at a later time, in which of the high-side transistor arrangement area and the low-side transistor arrangement area an overcurrent occurred, and thus enhancement in the reliability or the like can be implemented.

In FIG. 9, the temperature sensor unit TS1 is disposed in the second side area AR2 as in FIG. 1, and the temperature sensor unit TS2 is disposed in an area AR3 located close to the high-side transistor arrangement area, rather than in the first side area AR1. This configuration enables supply of the power supply VSS to the temperature sensor units TS1 and TS2 at a lower impedance, and thus the deterioration in the accuracy of overheating detection due to noise can be effectively suppressed. That is, if noise is applied to a supply node of the power supply VSS that supplies power to the temperature sensor unit TS shown in FIG. 7 when the temperature is near the setting temperature for starting overheating protection as shown in FIG. 8, the temperature detection voltage VTD fluctuates near the setting temperature, and as a result a problem such as the deterioration in the accuracy of overheating detection may occur. In this regard, by supplying the power supply VSS to the temperature sensor unit TS at a low impedance as described above, the occurrence of such a problem can be suppressed.

Figure 10:
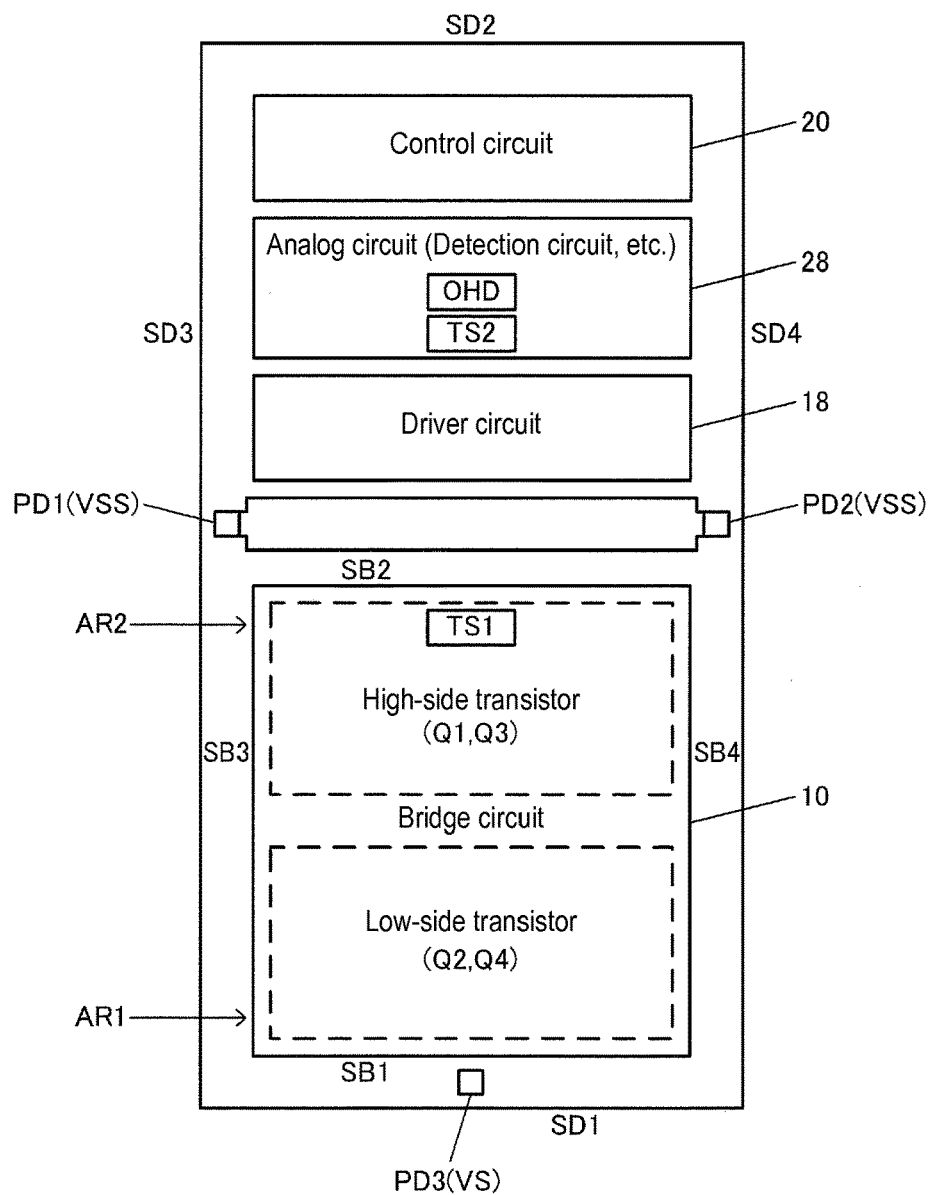
FIG. 10 shows another example arrangement in the case where a plurality of temperature sensor units are disposed.
Figure 10:
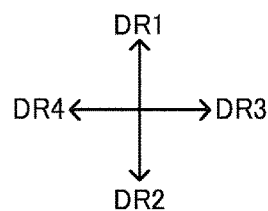

FIG. 10 is a diagram showing another example arrangement of a plurality of temperature sensor units. In FIG. 10, a first temperature sensor unit TS1 among a plurality of temperature sensor units is disposed in the arrangement area of the bridge circuit 10, and a second temperature sensor unit TS2 is disposed in an outside area of the arrangement area of the bridge circuit 10. To be specific, the temperature sensor unit TS2 is disposed in the arrangement area of the analog circuit 28.

If, for example, overheating state detection is performed by using the absolute temperature as shown in FIG. 8 alone, the detection speed may be lowered or an error may occur in the detection accuracy.

In this regard, in FIG. 10, overheating state detection can be performed based on a temperature difference between a detection temperature detected by the temperature sensor unit TS1 and a detection temperature detected by the temperature sensor unit TS2. Overheating detection can be performed based on, for example, a first temperature detection signal from the temperature sensor unit TS1 and a second temperature detection signal from the temperature sensor unit TS2. That is, in the event of an overcurrent in the transistors of the bridge circuit 10, the temperature in the arrangement area of the bridge circuit 10 first increases, and thereafter the temperature in the arrangement area of the analog circuit 28 increases gradually. Accordingly, effective overheating detection can be implemented based on the temperature difference between the detection temperature detected by the temperature sensor unit TS1 and the detection temperature detected by the temperature sensor unit TS2. That is, overheating detection can be performed based on a result of comparison between the first temperature detection signal from the temperature sensor unit TS1 and the second temperature detection signal from the temperature sensor unit TS2. And, by performing overheating detection based on a temperature difference between a plurality of locations in the circuit apparatus as described above, enhancement of the detection speed, detection accuracy and the like can be expected, and more intelligent overheating detection can be implemented. For example, even when it takes time to detect the absolute temperature, by detecting a relative temperature difference, the detection speed and the like can be enhanced.

Figure 11:
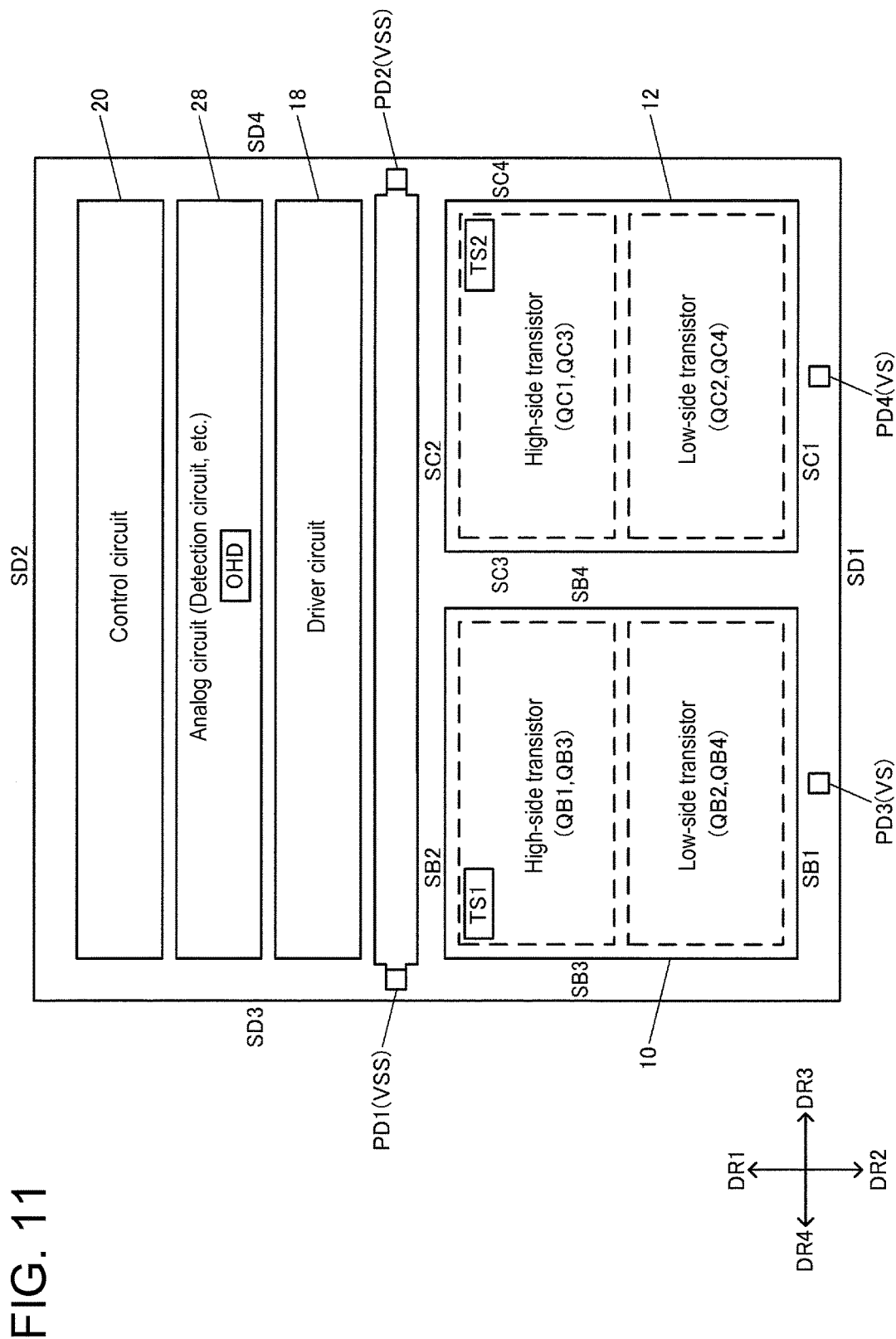
FIG. 11 shows another example arrangement in the case where a plurality of temperature sensor units are disposed.

FIG. 11 shows another example arrangement. In FIG. 11, the circuit apparatus includes, in addition to a first bridge circuit 10, a second bridge circuit 12 including high-side transistors and low-side transistors. The first bridge circuit 10 is a first channel bridge circuit, and the second bridge circuit 12 is a second channel bridge circuit. In FIG. 11, a pad PD3 for connecting the sources of the low-side transistors of the first bridge circuit 10 to an external sense resistor and a pad PD4 for connecting the sources of the low-side transistors of the second bridge circuit 12 to an external sense resistor are provided. As a result of providing the two channel bridge circuits 10 and 12 as described above, two motors can be driven simultaneously by using one circuit apparatus, and a reduction in the size and cost of the electronic appliance can be implemented. In addition, as a result of providing the two channel bridge circuits 10 and 12, it is also possible to implement single-phase driving, microstepping and the like of stepping motors.

Also, in FIG. 11, the first temperature sensor unit TS1 among the plurality of temperature sensor units is disposed in an arrangement area of the first bridge circuit 10, and the second temperature sensor unit TS2 is disposed in an arrangement area of the second bridge circuit 12. To be specific, the temperature sensor unit TS1 is disposed in an area on a second side SB2 side in the bridge circuit 10, and the temperature sensor unit TS2 is disposed in an area on a second side SC2 side in the bridge circuit 12.

With the example arrangement shown in FIG. 11, if an overheating state occurs due to an overcurrent in the bridge circuit 10, the overheating state can be detected in a short time by the temperature sensor unit TS1 disposed in the arrangement area of the bridge circuit 10. If, on the other hand, an overheating state occurs due to an overcurrent in the bridge circuit 12, the overheating state can be detected in a short time by the temperature sensor unit TS2 disposed in the arrangement area of the bridge circuit 12.

Also, with the example arrangement shown in FIG. 11, the temperatures in the arrangement areas of the bridge circuits 10 and 12 can be individually detected and stored. For example, the results of overheating state detection performed by the temperature sensor units TS1 and TS2 may be stored in an unshown storage unit provided in the circuit apparatus. With this configuration, it is possible to identify, at a later time, in which of the arrangement areas of the first channel bridge circuit 10 and the second channel bridge circuit 12, an overcurrent occurred, and thus enhancement in the reliability or the like can be implemented.

Figure 12:
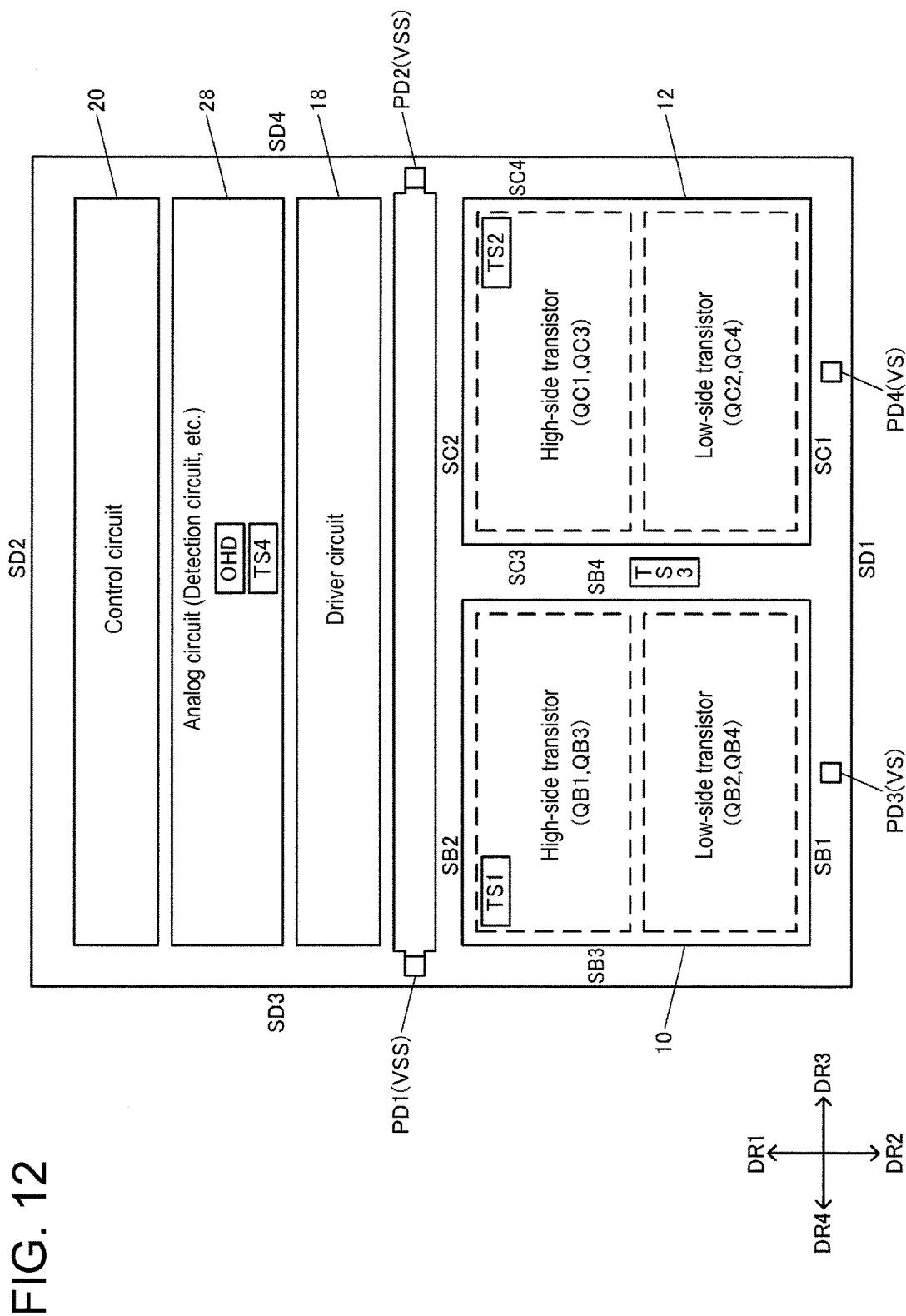
FIG. 12 shows another example arrangement in the case where a plurality of temperature sensor units are disposed.

FIG. 12 shows still another example arrangement. In FIG. 12, a third temperature sensor unit TS3 among a plurality of temperature sensor units is disposed between the first bridge circuit 10 and the second bridge circuit 12. As described above, by disposing a plurality of temperature sensors TS1, TS2 and TS3 in a dispersed manner in the arrangement areas of the bridge circuits 10 and 12, an average temperature of all of the arrangement areas of the bridge circuits 10 and 12 can be measured. It is possible to perform overheating detection by performing, for example, processing of averaging the temperature detection voltages of the temperature sensor units TS1, TS2 and TS3.

Also, in the example arrangement shown in FIG. 12, a fourth temperature sensor unit TS4 among the plurality of temperature sensor units is disposed in an area of the analog circuit 28. That is, the temperature sensor units TS1, TS2 and TS3 are disposed in positions close to the bridge circuits 10 and 12, whereas the temperature sensor unit TS4 is disposed in a position far away from the bridge circuits 10 and 12. This configuration enables heat detection to be performed by using a temperature difference between a detection temperature detected by the temperature sensor unit TS4 and a detection temperature detected by each of the temperature sensor units TS1, TS2 and TS3, and it is therefore possible to implement overheating detection with higher detection accuracy and reliability.

Figure 13:
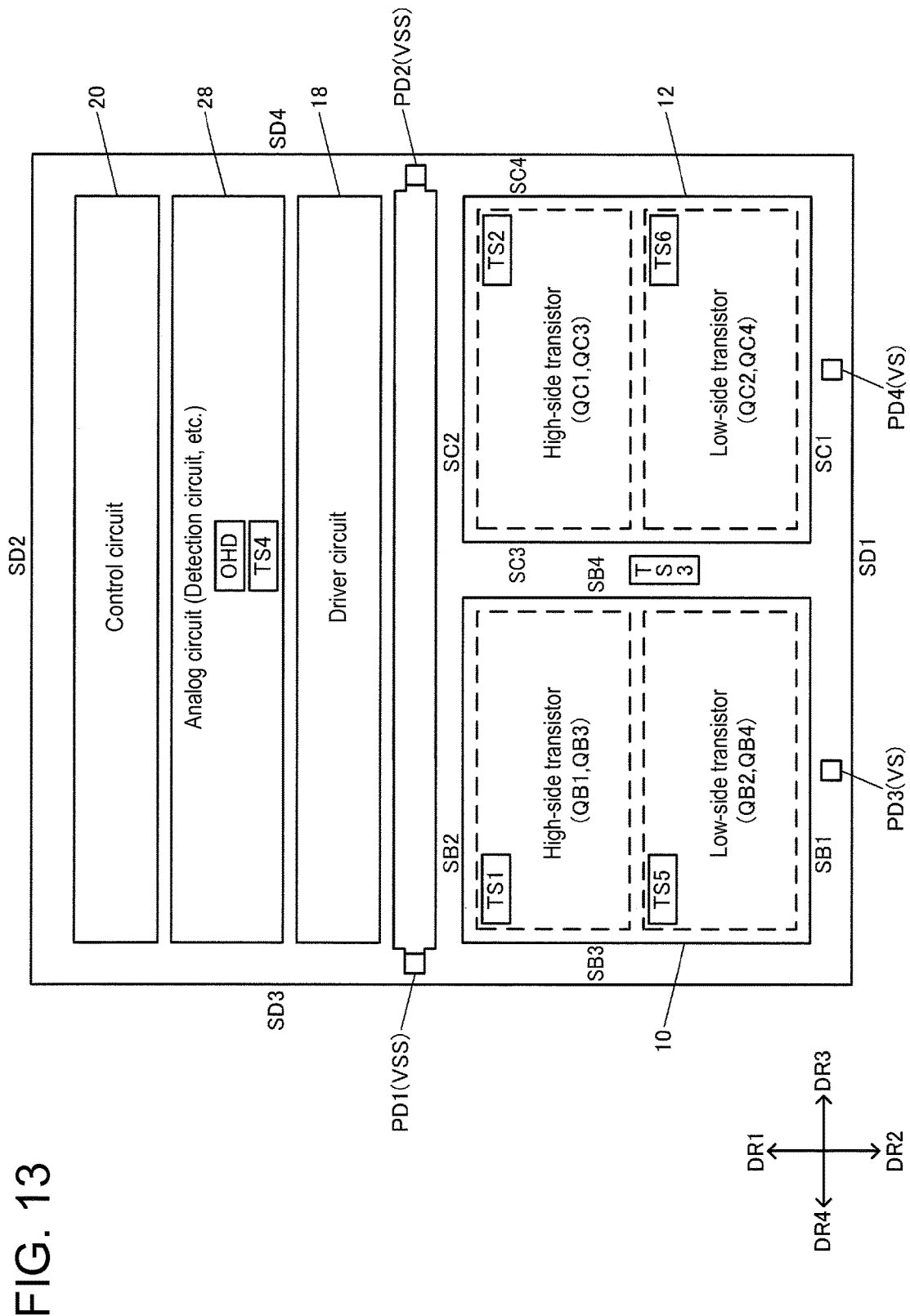
FIG. 13 shows another example arrangement in the case where a plurality of temperature sensor units are disposed.

FIG. 13 shows still another example arrangement. In FIG. 13, the temperature sensor units TS1, TS2, TS3 and TS4 are disposed at the same positions as in FIG. 12. A temperature sensor unit TS5 is disposed in the low-side transistor arrangement area of the bridge circuit 10, and a temperature sensor unit TS6 is disposed in the low-side transistor arrangement area of the bridge circuit 12.

With this configuration, in the bridge circuit 10, if an overheating state occurs due to an overcurrent in the high-side transistors (QB1 and QB3), the overheating state can be detected in a short time by the temperature sensor unit TS1. If an overheating state occurs due to an overcurrent in the low-side transistors (QB2 and QB4), the overheating state can be detected in a short time by the temperature sensor unit TS5.

Likewise, in the bridge circuit 12, if an overheating state occurs due to an overcurrent in the high-side transistors (QC1 and QC3), the overheating state can be detected in a short time by the temperature sensor unit TS2. If an overheating state occurs due to an overcurrent in the low-side transistors (QC2 and QC4), the overheating state can be detected in a short time by the temperature sensor unit TS6.

Also, in FIG. 13, the temperature sensor units TS1, TS2, TS3, TS5 and TS6 are disposed in a more uniformly dispersed manner in the arrangement areas of the bridge circuits 10 and 12. Accordingly, by performing processing of averaging the results of temperature detection performed by the temperature sensor units TS1, TS2, TS3, TS5 and TS6, the detection accuracy and the like can be further enhanced.

Figure 14:
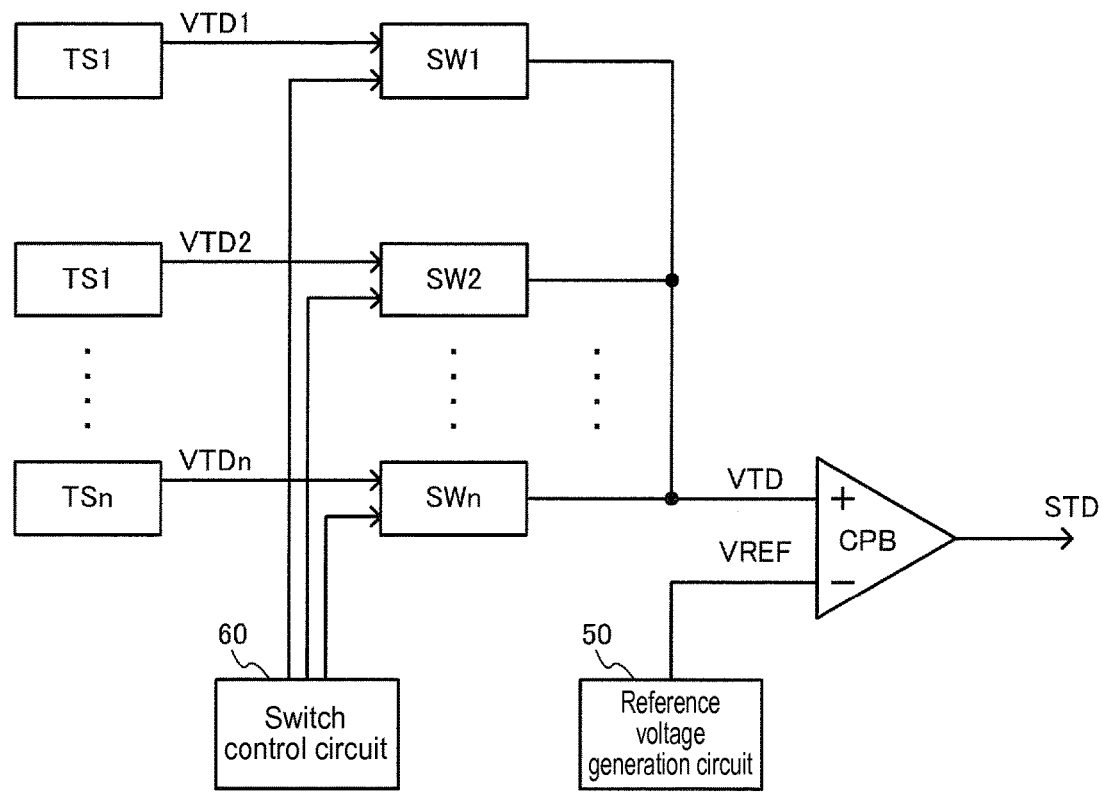
FIG. 14 is a diagram illustrating a method for performing overheating detection based on the temperature detection signals from a plurality of temperature sensor units.

FIG. 14 is a diagram showing an example configuration of the overheating protection circuit 40 in the case where a plurality of temperature sensor units TS1 to TSn (n is an integer of 2 or more) are disposed in the circuit apparatus.

Temperature detection voltages VTD1 to VTDn from the temperature sensor units TS1 to TSn are input into a first input terminal (+) of a comparison circuit CPB via switch elements SW1 to SWn. To be specific, in response to a switch control circuit 60 turning on any one of the switch elements SW1 to SWn, a temperature detection voltage from a temperature sensor unit connected to the switch element that has been turned on is input into the first input terminal (+) of the comparison circuit CPB. For example, if the switch element SW1 is turned on, VTD1 from the temperature sensor unit TS1 is input into the first input terminal of the comparison circuit CPB as a temperature detection voltage VTD, and processing of comparison between the temperature detection voltage and a reference voltage VREF is performed. If the switch element SW2 is turned on, VTD2 from the temperature sensor unit TS2 is input into the first input terminal of the comparison circuit CPB as the temperature detection voltage VTD, and processing of comparison between the temperature detection voltage and the reference voltage VREF is performed. That is, in FIG. 14, the overheating detection unit OHD (comparison circuit) performs overheating detection based on a first temperature detection signal (VTD1) from a first temperature sensor unit (TS1) and a second temperature detection signal (VTD2) from a second temperature sensor unit (TS2) among a plurality of temperature sensor units. With this configuration, it is possible to determine whether or not the detection temperature detected by each temperature sensor unit (TS1 to TSn) has exceeded the setting temperature (150 degrees Celsius) for starting overheating protection shown in FIG. 8.

Figure 15:
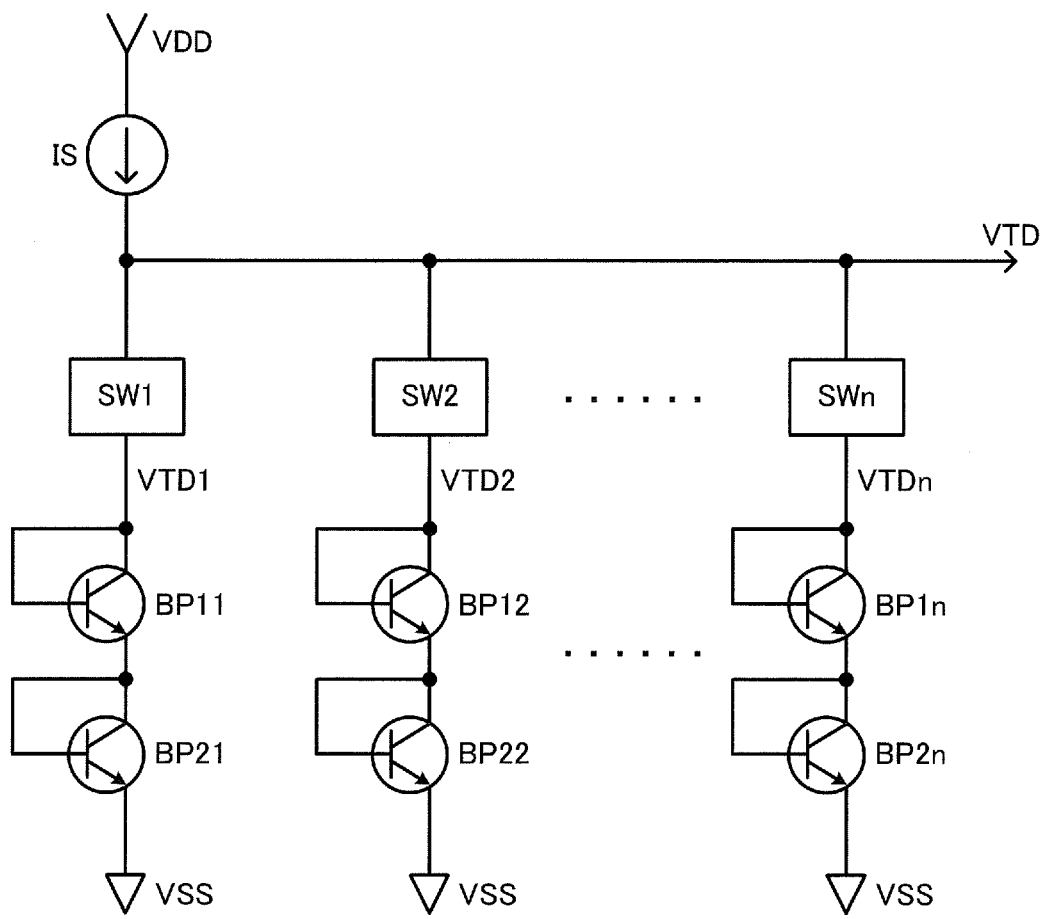
FIG. 15 shows an example of a detailed configuration for performing overheating detection based on the temperature detection signals from a plurality of temperature sensor units.

FIG. 15 is a diagram showing a detailed example of implementation of FIG. 14. In FIG. 15, the temperature sensor units TS1, TS2 . . . and TSn shown in FIG. 14 are implemented by a pair of bipolar transistors BP11 and BP21, a pair of bipolar transistors BP12 and BP22, . . . and a pair of bipolar transistors BP1n and BP2n, respectively. The collectors of the bipolar transistors BP11, BP12 . . . and BP1n are connected to the current source IS via the switch elements SW1, SW2 . . . and SWn. That is, the current source IS is shared by the bipolar transistors BP11 and BP21, the bipolar transistors BP12 and BP22 . . . and the bipolar transistors BP1n and BP2n. In this case, the current source IS is disposed in, for example, the arrangement area of the analog circuit 28, and may constitute, for example, the overheating detection unit OHD.

Figures 16A, 16B:
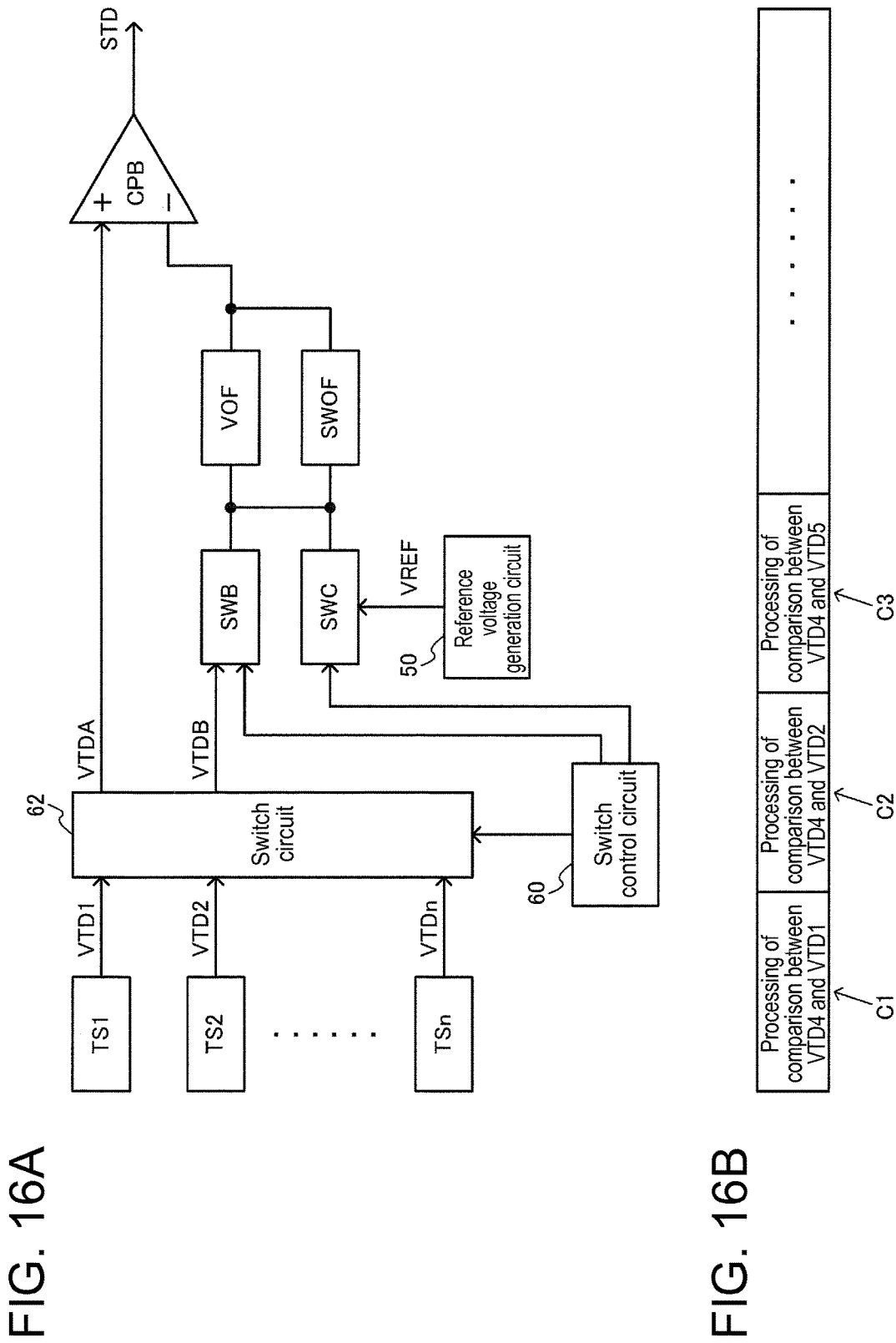
FIGS. 16A and 16B are diagrams illustrating a method for performing overheating detection based on the temperature detection signals input in a time division manner from a plurality of temperature sensor units.

FIG. 16A is a diagram showing another example configuration of the overheating protection circuit 40 in the case where the plurality of temperature sensor units TS1 to TSn are disposed in the circuit apparatus.

In response to the switch control circuit 60 performing switch control, a switch circuit 62 selects two from among the temperature detection voltages of the temperature sensor units TS1 to TSn, and outputs the selected temperature detection voltages as temperature detection voltages VTDA and VTDB.

In a first detection mode in which a relative temperature difference is detected for overheating detection, a switch element SWB is turned on, and switch elements SWC and SWOF are turned off. Then, the comparison circuit CPB compares the temperature detection voltage VTDA with a voltage obtained by adding an offset voltage VOF to the temperature detection voltage VTDB. By doing so, if a difference between a detection temperature corresponding to the temperature detection voltage VTDA and a detection temperature corresponding to the temperature detection voltage VTDB reaches a predetermined temperature difference (a temperature difference corresponding to the offset voltage VOF), it is possible to detect the fact that the difference has reached the predetermined temperature difference.

It is assumed here, for example, that the temperature detection voltages VTD1 and VTD2 of the temperature sensor units TS1 and TS2 are selected by the switch circuit 62 as the temperature detection voltages VTDA and VTDB. In this case, it is possible to, in the first detection mode, detect whether the difference between the detection temperature detected by the temperature sensor unit TS1 and the detection temperature detected by the temperature sensor unit TS2 has reached a predetermined temperature difference. As a result, it is possible to implement overheating detection based on the temperature difference, and enhance the detection speed, the detection accuracy and the like.

On the other hand, in a second detection mode in which the absolute overheating temperature is detected, the switch elements SWC and SWOF are turned on, and the switch element SWB is turned off. Then, the switch circuit 62 selects one from among the temperature detection voltages of the temperature sensor units TS1 to TSn, and outputs the selected temperature detection voltage as the temperature detection voltage VTDA. Then, the comparison circuit CPB performs processing of comparing the temperature detection voltage VTDA with the reference voltage VREF input from the reference voltage generation circuit 50 via the switch elements SWC and SWOF. By doing so, it is possible to detect the absolute overheating temperature as described with reference to FIG. 8. That is, it is possible to detect whether or not the detection temperature detected by each temperature sensor unit TS1 to TSn has reached the setting temperature for starting overheating protection.

According to the method using the example configuration shown in FIG. 16A described above, the overheating detection unit OHD can perform overheating detection based on a result of comparison between a first temperature detection signal (for example, VTD1) from a first temperature sensor unit (for example, TS1) and a second temperature detection signal (for example, VTD2) from a second temperature sensor unit (for example, TS2). That is, it is possible to perform overheating detection in the first detection mode in which a relative temperature difference is detected, and the detection speed, the detection accuracy and the like can be enhanced.

In this case, it is desirable that, as indicated by C1, C2 and C3 in FIG. 16B, the overheating detection unit OHD performs overheating detection based on the temperature detection signals input in a time division manner from the plurality of temperature sensor units TS1 to TSn.

For example, in C1 shown in FIG. 16B, the switch circuit 62 selects temperature detection voltages (in a broad sense, temperature detection signal) VTD4 and VTD1 from the temperature sensor units TS4 and TS1 as the temperature detection voltages VTDA and VTDB. In response thereto, VTDA=VTD4 is input into the first input terminal (+) of the comparison circuit CPB of the overheating detection unit OHD, and VTDB=VTD1+VOF is input into the second input terminal (−) of the same. Then, overheating detection is performed by processing of comparison between the temperature detection voltages VTDA and VTDB. To be specific, it is determined whether or not the temperature difference between the detection temperature detected by the temperature sensor unit TS4 and the detection temperature detected by the temperature sensor unit TS1 has exceeded a temperature difference corresponding to the offset voltage VOF. If it is determined that the temperature difference has exceeded the temperature difference corresponding to the offset voltage VOF, the state is determined as an overheating state. For example, it is determined whether or not the temperature difference between the detection temperature detected by the temperature sensor unit TS4 disposed in the area of the analog circuit 28 distant from the bridge circuit 10 and the detection temperature detected by the temperature sensor unit TS1 disposed in the high-side transistor area of the bridge circuit 10 in FIG. 13 has exceeded a predetermined temperature. Thereafter, if an overcurrent flows in the high-side transistors of the bridge circuit 10, because the detection temperature detected by the temperature sensor unit TS1 increases earlier than the detection temperature detected by the temperature sensor unit TS4, a temperature difference occurs between these detection temperatures. By detecting the temperature difference, the overheating detection unit OHD can detect the overcurrent state that has occurred due to the overcurrent in the high-side transistors of the bridge circuit 10.

Next, in C2 shown in FIG. 16B, the switch circuit 62 selects temperature detection voltages VTD4 and VTD2 from the temperature sensor units TS4 and TS2 as the temperature detection voltages VTDA and VTDB. In response thereto, VTDA=VTD4 is input into the first input terminal of the comparison circuit CPB of the overheating detection unit OHD, and VTDB=VTD2+VOF is input into the second input terminal of the same. Then, overheating detection is performed by processing of comparison between the temperature detection voltages VTDA and VTDB. For example, it is determined whether or not the temperature difference between the detection temperature detected by the temperature sensor unit TS4 disposed in the area of the analog circuit 28 and the detection temperature detected by the temperature sensor unit TS2 disposed in the high-side transistor area of the bridge circuit 12 in FIG. 13 has exceeded a predetermined temperature. Thereafter, if an overcurrent flows in the high-side transistors of the bridge circuit 12, because the detection temperature detected by the temperature sensor unit TS2 increases earlier than the detection temperature detected by the temperature sensor unit TS4, a temperature difference occurs between these detection temperatures. By detecting the temperature difference, the overheating detection unit OHD can detect the overcurrent state that has occurred due to the overcurrent in the high-side transistors of the bridge circuit 12.

Next, in C3 shown in FIG. 16B, the switch circuit 62 selects temperature detection voltages VTD4 and VTD5 from the temperature sensor units TS4 and TS5 as the temperature detection voltages VTDA and VTDB. In response thereto, VTDA=VTD4 is input into the first input terminal of the comparison circuit CPB of the overheating detection unit OHD, and VTDB=VTD5+VOF is input into the second input terminal of the same. Then, overheating detection is performed by processing of comparison between the temperature detection voltages VTDA and VTDB. For example, it is determined whether or not the temperature difference between the detection temperature detected by the temperature sensor unit TS4 disposed in the area of the analog circuit 28 and the detection temperature detected by the temperature sensor unit TS5 disposed in the low-side transistor area of the bridge circuit 10 in FIG. 13 has exceeded a predetermined temperature difference. Thereafter, if an overcurrent flows in the low-side transistors of the bridge circuit 10, because the detection temperature detected by the temperature sensor unit TS5 increases earlier than the detection temperature detected by the temperature sensor unit TS4, a temperature difference occurs between these detection temperatures. By detecting the temperature difference, the overheating detection unit OHD can detect the overheating state that has occurred due to the overcurrent in the low-side transistors of the bridge circuit 10.

As described above, by disposing a plurality of temperature sensor units in the circuit apparatus, and performing processing of comparison between the temperature detection signals input in a time division manner from the temperature sensor units, it is possible to perform overheating detection based on a temperature difference between different locations in the circuit apparatus, and enhance the detection accuracy of overheating detection, and the detection speed.

5. DMOS

In the present embodiment, DMOS (Double-diffused Metal Oxide Semiconductor) transistors are used as the transistors Q1 to Q4 constituting the bridge circuit 10. Also, CMOS (Complementary Metal Oxide Semiconductor) transistors are used as the transistors constituting the logic circuit 20, the analog circuit 28 and the like.

Figure 17:
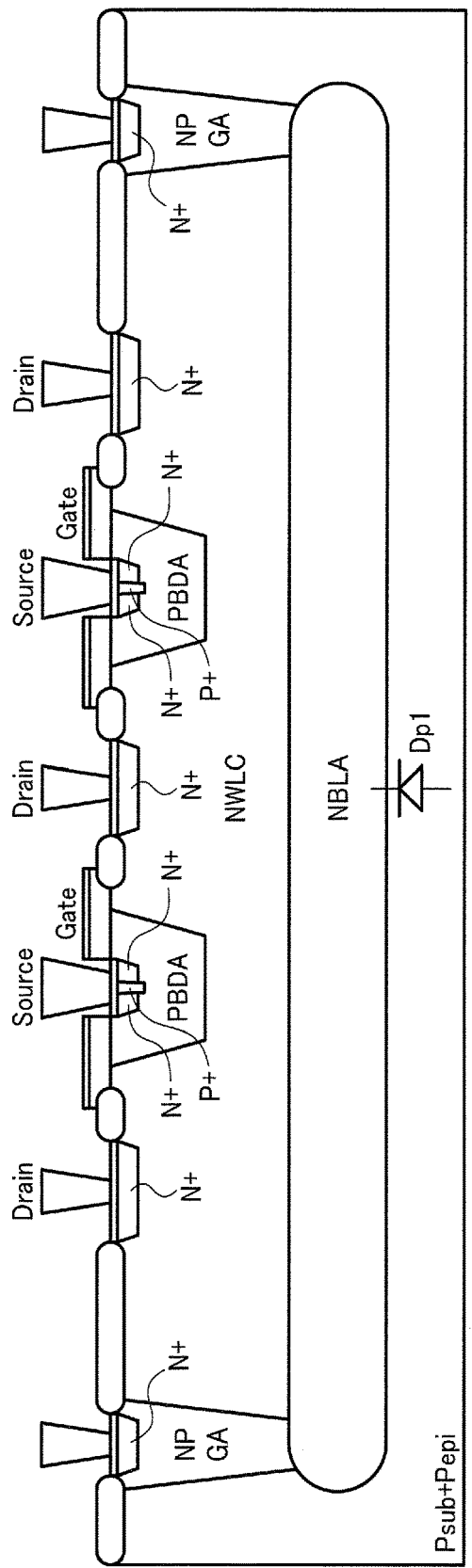
FIG. 17 is a cross-sectional view of N-type DMOS transistors.

FIG. 17 shows an example of a structure of low-side transistors (Q2 and Q4) in cross section. In this example, N-type DMOS transistors are formed on a P-type silicon substrate as low-side transistors.

To be more specific, an N-type buried layer (NBLA) is formed on the P-type substrate (Psub), a P-type epitaxial layer is formed on the buried layer, and an N-type well (NWLC) is formed in the epitaxial layer. An N-type diffusion layer is formed in the N-type well so as to form drains of the N-type DMOS transistors. Also, a P-type well (PBDA) is formed in the N-type well, and an N-type diffusion layer is formed in the P-type well so as to form sources of the N-type DMOS transistors. The P-type well (PBDA) is set to the same potential as the source voltage by a P-type diffusion layer connected to the sources.

The P-type substrate (Psub) is set to the voltage (GND) of VSS. The drains of the N-type DMOS transistors are connected to the N-type area (N-type diffusion layer) so as to be in contact with the P-type substrate via the underlying N-type layers (NWLC and NBLA), and thus a parasitic diode Dp1 is formed between the drains and the P-type substrate.

Figure 18:
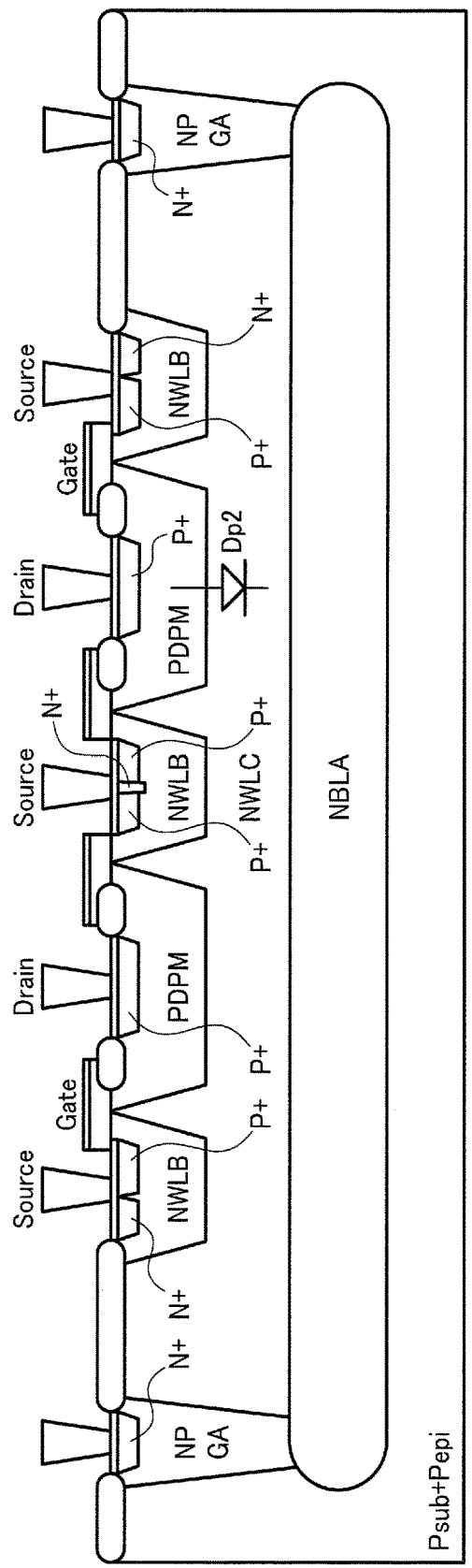
FIG. 18 is a cross-sectional view of P-type DMOS transistors.

FIG. 18 shows an example of a structure of high-side transistors (Q1 and Q3) in cross section. In this example, P-type DMOS transistors are formed on a P-type silicon substrate as high-side transistors.

To be more specific, an N-type buried layer (NBLA) is formed on the P-type substrate (Psub), a P-type epitaxial layer is formed on the buried layer, and an N-type well (NWLC) is formed in the epitaxial layer. A P-type well (PDPM) is formed in the N-type well, and a P-type diffusion layer is formed in the P-type well so as to form drains of the P-type DMOS transistors. Also, another N-type well (NWLB) is formed in the N-type well (NWLC), and an N-type diffusion layer and a P-type diffusion layer are formed in the N-type well so as to form sources of the P-type DMOS transistors. The N-type well (NWLB) is set to the same potential as the source voltage by the N-type diffusion layer connected to the sources.

The P-type substrate (Psub) is set to the voltage (GND) of VSS. The N-type area (the N-type layers NWLC and NBLA) on the P-type substrate is set to the power supply voltage VBB via the N-type wells (NWLB) of the sources. The drains are connected to the P-type area (P-type diffusion layer) so as to be in contact with the N-type area via the underlying P-type layer (PDPM), and thus a parasitic diode Dp2 is formed between the drains and the N-type area.

As described above, in the present embodiment, as shown in FIGS. 17 and 18, DMOS transistors are used as the high-side transistors and the low-side transistors of the bridge circuit 10 (12). In this case, according to the present embodiment, the temperature sensor unit TS can be formed by a body diode of the DMOS transistor. That is, the temperature detection element of the temperature sensor unit TS can be implemented by a body diode of the DMOS transistor.

For example, FIG. 19 corresponds to a cross-sectional view of N-type DMOS transistors as in FIG. 17. As indicated by A1 in FIG. 19, the gate and the source of a transistor TR are connected, and a body diode DB formed between the source and the drain of the transistor TR is used as the temperature detection element of the temperature sensor unit TS.

That is, in FIG. 19, as a result of connecting the gate and the source of a transistor TR, the channel of the transistor TR is not formed, and the source and the gate serve as the anode (A) of the body diode DB. On the other hand, the drain of the transistor TR serves as the cathode (K) of the body diode DB, and body diodes DB whose forward direction is from anode to cathode are formed. In other words, body diodes DB in which the P-type area (PBDA) electrically connected to the source via the P-type diffusion layer serves as the anode, and the N-type area (NWLC, NBLA) electrically connected to the drain via the N-type diffusion layer serves as the cathode are formed.

The body diodes DB have negative temperature characteristics as in FIG. 8. Accordingly, by using, instead of the bipolar transistors BP1 and BP2 shown in FIG. 7, the body diodes DB of the DMOS transistors TR, it is possible to implement the temperature detection element of the temperature sensor unit TS for overheating detection.

6. Electronic Appliance

Figure 20:
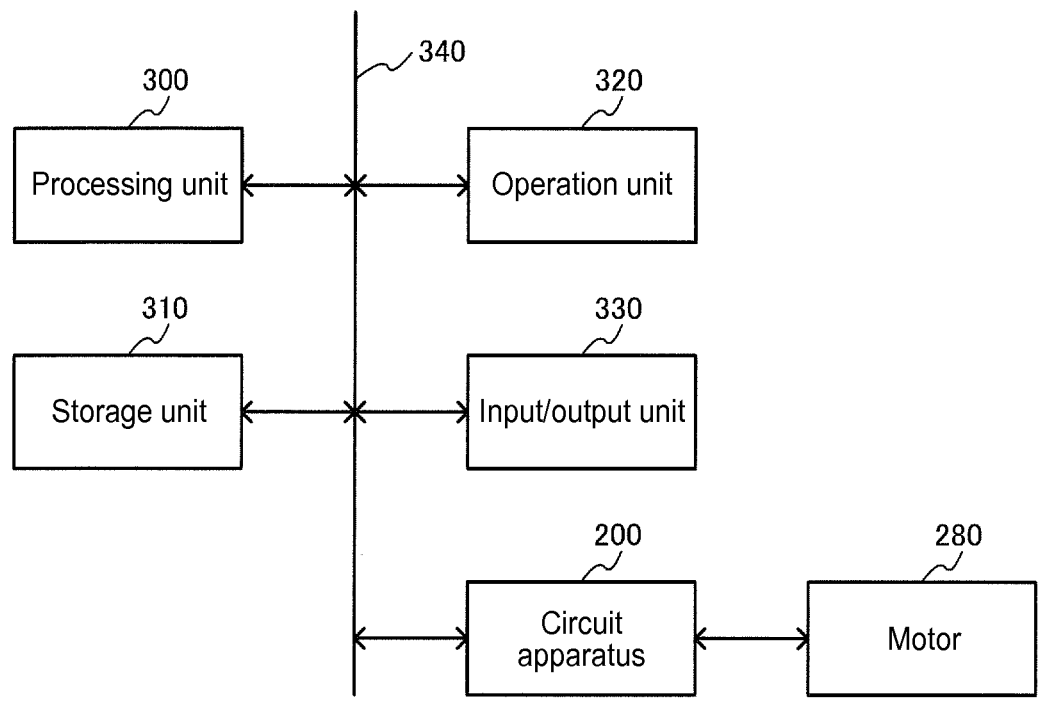
FIG. 20 is an example configuration of an electronic appliance.

FIG. 20 shows an example configuration of an electronic appliance to which a circuit apparatus 200 (motor driver) according to the present embodiment is applied. The electronic appliance includes a processing unit 300, a storage unit 310, an operation unit 320, an input/output unit 330, a circuit apparatus 200, a bus 340 connecting these units, and a motor 280. Hereinafter, a description will be given by taking a printer that controls its head and paper feed by motor driving as an example, but the present embodiment is not limited thereto, and may be applied to various types of electronic appliances.

The input/output unit 330 is formed by, for example, an interface such as a USB connector, a wireless LAN or the like, and receives an input of image data and document data. The input data is stored in the storage unit 310, which is an internal storage device such as, for example, DRAM. Upon receiving a print instruction from the operation unit 320, the processing unit 300 starts an operation of printing data stored in the storage unit 310. The processing unit 300 issues an instruction regarding the print layout of the data to the circuit apparatus (motor driver) 200, and the circuit apparatus 200 rotates the motor 280 based on the instruction so as to move the head and perform paper feeding.

Although the embodiment according to the invention has been described in detail above, those skilled in the art can easily recognize that many variations that do not substantially depart from the new matter and effects of the invention are possible. Accordingly, all such variations are included in the scope of the invention. For example, a term (P-type, N-type, motor, bipolar transistor, temperature detection voltage, or the like) described together with a different term (first conductivity type, second conductivity type, object to be driven, temperature detection element, temperature detection signal, or the like) having a broader meaning or the same meaning at least once in the specification or drawings may be replaced by the different term in anywhere in the specification or drawings. In addition, all combinations of the present embodiment and variations are also included in the scope of the invention. Furthermore, the configuration, operations and arrangement configurations of the circuit apparatus and the like are not limited to those described in the present embodiment, and various variations can be made.

This application claims priority from Japanese Patent Application No. 2014-204506 filed in the Japanese Patent Office on Oct. 3, 2014, the entire disclosure of which is hereby incorporated by reference in its entirely.

What is claimed is:

1. A circuit apparatus comprising:
a bridge circuit including a high-side transistor and a low-side transistor;
a temperature sensor; and
an overheating detector that performs overheating detection based on a temperature detection signal from the temperature sensor,
wherein:
the temperature sensor is disposed in a position physically closer to the bridge circuit than the overheating detector,
one of the high-side transistor and the low-side transistor is formed in areas that are provided adjacent three sides of the temperature sensor, and
an other of the high-side transistor and the low-side transistor is formed separated from the temperature sensor in a direction of one of the three sides of the temperature sensor to which the one of the high-side transistor and the low-side transistor is adjacent.

2. The circuit apparatus according to claim 1,
wherein the temperature sensor is disposed in an arrangement area of the bridge circuit.

3. A circuit apparatus comprising:
a bridge circuit including a high-side transistor and a low-side transistor;
at least one temperature sensor; and
an overheating detector that performs overheating detection based on a temperature detection signal from the at least one temperature sensor,
wherein:
the at least one temperature sensor is disposed in an arrangement area of the bridge circuit,
one of the high-side transistor and the low-side transistor is formed in areas that are provided adjacent three sides of the at least one temperature sensor, and
another of the high-side transistor and the low-side transistor is formed separated from the temperature sensor in a direction of one of the three sides of the temperature sensor to which the one of the high-side transistor and the low-side transistor is adjacent.

4. The circuit apparatus according to claim 2,
wherein:
the arrangement area of the bridge circuit includes a first side area and a second side area,
the second side area is closer to the overheating detector than the first side area, and
the temperature sensor is disposed in the second side area.

5. The circuit apparatus according to claim 1, comprising a low potential-side power supply pad that receives a low potential-side power supply,
wherein the temperature sensor is disposed in a position closer to the low potential-side power supply pad than the low-side transistor of the bridge circuit is.

6. The circuit apparatus according to claim 1, comprising a driver circuit that outputs drive signals to the high-side transistor and the low-side transistor of the bridge circuit,
wherein the temperature sensor is disposed in a position closer to the bridge circuit than the driver circuit is.

7. The circuit apparatus according to claim 1, comprising a control circuit that performs control so as to turn on and off the high-side transistor and the low-side transistor of the bridge circuit,
wherein the temperature sensor is disposed in a position closer to the bridge circuit than the control circuit is.

8. The circuit apparatus according to claim 1,
wherein a plurality of temperature sensors are disposed as the temperature sensor.

9. The circuit apparatus according to claim 8,
wherein a first temperature sensor among the plurality of temperature sensor units is disposed in an arrangement area of the high-side transistor of the bridge circuit, and
a second temperature sensor among the plurality of temperature sensors is disposed in an arrangement area of the low-side transistor of the bridge circuit.

10. The circuit apparatus according to claim 8,
wherein a first temperature sensor among the plurality of temperature sensors is disposed in an arrangement area of the bridge circuit, and
a second temperature sensor among the plurality of temperature sensors is disposed in an outside area of the arrangement area of the bridge circuit.

11. The circuit apparatus according to claim 8, comprising a second bridge circuit including a high-side transistor and a low-side transistor,
wherein a first temperature sensor among the plurality of temperature sensors is disposed in an arrangement area of a first bridge circuit, which is the bridge circuit, and
a second temperature sensor among the plurality of temperature sensors is disposed in an arrangement area of the second bridge circuit.

12. The circuit apparatus according to claim 11,
wherein a third temperature sensor among the plurality of temperature sensors is disposed between the first bridge circuit and the second bridge circuit.

13. The circuit apparatus according to claim 8,
wherein the overheating detector performs overheating detection based on a first temperature detection signal from a first temperature sensor among the plurality of temperature sensors and a second temperature detection signal from a second temperature sensor among the plurality of temperature sensors.

14. The circuit apparatus according to claim 13,
wherein the overheating detector performs overheating detection based on a result of comparison between the first temperature detection signal and the second temperature detection signal.

15. The circuit apparatus according to claim 8,
wherein the overheating detector performs overheating detection based on temperature detection signals input in a time division manner from the plurality of temperature sensors.

16. The circuit apparatus according to claim 1,
wherein the high-side transistor and the low-side transistor are DMOS transistors, and
the temperature sensor is formed by a body diode of a DMOS transistor.

17. An electronic appliance comprising the circuit apparatus according to claim 1.

18. The circuit apparatus according to claim 1, wherein:
the arrangement area of the bridge circuit includes a first side area and a second side area,
the second side area is closer to the overheating detector than the first side area,
the high-side transistor and the temperature sensor are disposed in the second side area, and
the low-side transistor is disposed in the first side area.

\* \* \* \* \*